United States Patent
Wu

(10) Patent No.: US 8,548,661 B2
(45) Date of Patent: Oct. 1, 2013

(54) HYBRID WORKING MACHINE AND CONTROLLING METHOD THEREOF

(75) Inventor: Chunnan Wu, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 126 days.

(21) Appl. No.: 13/144,195

(22) PCT Filed: Jan. 15, 2010

(86) PCT No.: PCT/JP2010/050434
§ 371 (c)(1),
(2), (4) Date: Jul. 12, 2011

(87) PCT Pub. No.: WO2010/082636
PCT Pub. Date: Jul. 22, 2010

(65) Prior Publication Data
US 2011/0276212 A1    Nov. 10, 2011

(30) Foreign Application Priority Data

Jan. 16, 2009  (JP) .................... 2009-007949
Jun. 15, 2009  (JP) .................... 2009-142638

(51) Int. Cl.
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |

(52) U.S. Cl.
USPC .................... 701/22; 701/50; 180/65.21

(58) Field of Classification Search
USPC .................... 701/22; 180/53.8, 65.285
See application file for complete search history.

(56) References Cited

U.S. PATENT DOCUMENTS

| 5,267,441 | A * | 12/1993 | Devier et al. .................... 60/452 |
| 6,314,727 | B1 * | 11/2001 | Prabhu et al. .................... 60/431 |
| 6,375,433 | B1 * | 4/2002 | Du et al. ......................... 417/53 |
| 6,623,247 | B2 * | 9/2003 | Du .................................. 417/53 |
| 6,702,666 | B2 * | 3/2004 | Ho et al. ........................... 460/6 |
| 6,708,787 | B2 * | 3/2004 | Naruse et al. ................ 180/53.8 |
| 6,820,356 | B2 * | 11/2004 | Naruse et al. .................... 37/348 |

(Continued)

FOREIGN PATENT DOCUMENTS

| JP | 56-096188 | 8/1981 |
| JP | 10-103112 | 4/1998 |

(Continued)

OTHER PUBLICATIONS

International Search Report mailed on Apr. 13, 2010.

*Primary Examiner* — Khoi Tran
*Assistant Examiner* — Rachid Bendidi
(74) *Attorney, Agent, or Firm* — IPUSA, PLLC

(57) ABSTRACT

A control unit of a hybrid working machine calculates an actual hydraulic pressure output from the output of an engine (30) and the output of a motor generator (34), and calculates an assumed hydraulic pressure output (Win) as an output of a hydraulic pump (21) using a predetermined algorithm. The control unit corrects a hydraulic pump characteristic parameter used in the predetermined algorithm based on an assumed hydraulic pressure output error being a difference between an assumed hydraulic pressure output and an actual hydraulic pressure output, calculates an assumed hydraulic pressure correction output, and controls the motor generator (34) based on the assumed hydraulic pressure correction output.

17 Claims, 28 Drawing Sheets

(56) References Cited

U.S. PATENT DOCUMENTS

| | | | |
|---|---|---|---|
| 6,959,545 B2 * | 11/2005 | Lippert et al. | 60/430 |
| 6,989,640 B2 * | 1/2006 | Yoshimatsu | 318/34 |
| 7,357,214 B2 * | 4/2008 | Ho et al. | 180/307 |
| 8,136,271 B2 * | 3/2012 | Sakai et al. | 37/348 |
| 8,187,147 B2 * | 5/2012 | Tryon et al. | 477/52 |
| 2007/0210647 A1 * | 9/2007 | Miyazaki et al. | 303/155 |
| 2007/0214782 A1 * | 9/2007 | Komiyama et al. | 60/431 |
| 2010/0115800 A1 * | 5/2010 | Sakai et al. | 37/348 |

FOREIGN PATENT DOCUMENTS

| | | |
|---|---|---|
| JP | 2004-011256 | 1/2004 |
| JP | 2007-290607 | 11/2007 |
| JP | 2008-088660 | 4/2008 |
| JP | 2008-255699 | 10/2008 |
| JP | 2009-299480 | 12/2009 |

* cited by examiner

FIG.5

| PUMP SWASH PLATE ANGLE | | | | | | | | |
|---|---|---|---|---|---|---|---|---|
| | K1 | ... | Kj | Ki | Kj+1 | ... | Kn | |
| P1 | $\eta 1,1$ | | $\eta 1,j$ | $\eta 1,i$ | $\eta 1,j+1$ | | $\eta 1,n$ | |
| ... | | | ... | ... | ... | | ... | |
| Pj(1) | $\eta j,1$ | | $\eta j,j$ | $\eta j,i$ | $\eta j,j+1$ | | $\eta j1,n$ | |
| Pi | $\eta i,1$ | | $\eta i,j$ | $\eta o$ | $\eta i,j+1$ | | $\eta i1,n$ | |
| Pj+1(1) | $\eta j+1,1$ | | $\eta j+1,j$ | $\eta j+1,i$ | $\eta i,j+1$ | | $\eta j+1,n$ | |
| ... | | | ... | ... | ... | | ... | |
| Pn | $\eta n,1$ | | $\eta n,j$ | $\eta n,i$ | $\eta n,j+1$ | | $\eta n,n$ | |
| PUMP DISCHARGE PRESSURE | | | | | | | | |

$P1 < P2 < Pj \leq Pi \leq Pj+1 < Pm$ $K1 < K2 < Kj \leq Ki \leq Kj+1 < Kn$

FIG.9

| | PUMP SWASH PLATE ANGLE | | | | | | |
|---|---|---|---|---|---|---|---|
| BEFORE ADJUSTMENT | | k1 | ... | kj−1 | kj | kj+1 | ... | kn |
| | P1 | η11 | | η1,j−1 | η1j | η1,j+1 | | η1n |
| | ... | | | | | | | |
| | Pi−1 | ηi−1,1 | | ηi−1,j−1 | ηi−1,j | ηi−1,j+1 | | ηi−1,n |
| PUMP DIS-CHARGE PRES-SURE | Pi | ηi1 | | ηi,j−1 | ηij | ηi,j+1 | | ηin |
| | Pi+1 | ηi+1,1 | | ηi+1,j−1 | ηi+1,j | ηi+1,j+1 | | ηi+1,n |
| | ... | | | | | | | |
| | Pm | ηm1 | | ηm,j−1 | ηmj | ηm,j+1 | | ηmn |

$P1 < Pi-1 \leq Pi \leq Pi+1 < Pm$

⇓

| | PUMP SWASH PLATE ANGLE | | | | | | |
|---|---|---|---|---|---|---|---|
| AFTER ADJUSTMENT | | k1 | ... | kj−1 | kj | kj+1 | ... | kn |
| | P1 | η11 | | η1,j−1 | η1j | η1,j+1 | | η1n |
| | ... | | | | | | | |
| | Pi−1 | ηi−1,1 | | η'i−1,j−1 | η'i−1,j | η'i−1,j+1 | | ηi−1,n |
| PUMP DIS-CHARGE PRES-SURE | Pi | ηi1 | | ηi,j−1 | η'ij | η'i,j+1 | | ηin |
| | Pi+1 | ηi+1,1 | | η'i+1,j−1 | η'i+1,j | η'i+1,j+1 | | ηi+1,n |
| | ... | | | | | | | |
| | Pm | ηm1 | | ηm,j−1 | ηmj | ηm,j+1 | | ηmn |

$k1 < kj-1 \leq kj \leq kj+1 < kn$

HYBRID WORKING MACHINE AND CONTROLLING METHOD THEREOF

TECHNICAL FIELD

The present invention generally relates to a hybrid working machine and a controlling method of the hybrid working machine, and more specifically, to a hybrid working machine in which an internal combustion engine is assisted by an electric motor and a controlling method of the hybrid working machine.

BACKGROUND ART

Common hybrid working machines drive a hydraulic pump with the output of an engine (internal combustion engine) and do work with the generated hydraulic pressure. The engine is assisted with an electric motor to be driven with efficiency. The electric motor is driven mainly with electric power from a battery. The battery is allowed to be charged and discharged. In the case of assisting the engine, the battery is discharged to supply electric power to the electric motor. On the other hand, in the case of not assisting the engine, the battery is charged with electric power from a generator driven by the engine or regenerated electric power from a hydraulic load. Thereby, it is made possible to assist the electric motor by keeping the battery constantly charged to a certain level.

Thus, in hybrid working machines, it is possible to assist the engine with the electric motor. Therefore, the maximum output of the engine is reduced so that the engine may be reduced in size. If an output greater than the maximum output of the engine is required of the hydraulic pump, the request is met by assisting the engine with the electric motor.

By using a motor generator for the electric motor, the electric motor function and the generator function may be combined into one. In this case, it is necessary to control whether to execute the assist function as an electric motor or to execute the power generating function as a generator.

Therefore, it has been proposed to determine the output of the hydraulic pump by operations and to perform switching control over whether to cause a motor generator to operate as an electric motor or to operate as a generator by comparing the determined hydraulic pump output with a threshold. (See, for example, Patent Document 1.)

Further, in hybrid working machines, a variable displacement hydraulic pump is often used in order to allow a generated hydraulic pressure to vary in accordance with a hydraulic load's request. (See, for example, Patent Document 2.)

PRIOR ART DOCUMENTS

Patent Document

PATENT DOCUMENT 1: Japanese Laid-Open Patent Application No. 2004-11256
PATENT DOCUMENT 2: Japanese Laid-Open Patent Application No. 10-103112

DISCLOSURE OF THE INVENTION

Problems to be Solved by the Invention

The output of a hydraulic pump may be determined based on the pressure and the flow rate of the hydraulic pump. The output W of the hydraulic pump is obtainable by dividing a product of the discharge pressure P of the hydraulic pump and the discharge flow rate Q of the hydraulic pump by the pump efficiency $\eta$ like the following formula: $W=PQ/\eta$. The pump output W obtained by the formula is referred to as an assumed hydraulic pressure output W. The pump efficiency is acquired from the design value of the hydraulic pump. Therefore, the pump efficiency does not indicate output properties of the hydraulic pumps. An error may be generated between the assumed hydraulic pressure output W calculated based on the pump efficiency and an actual pump pressure because of various output properties of the hydraulic pumps. Further, the hydraulic pump may be degraded during the use of the hydraulic pump. In this case, the output property of the hydraulic pump changes and the pump efficiency may be changed. In this case, the pump efficiency obtained from the pump efficiency map becomes different from the actual pump efficiency. Then, the error is generated between the assumed hydraulic pressure output W and the actual pump output. If the error is generated between the assumed hydraulic pressure output W and the actual pump efficiency, an energy distribution to the assist motor and the engine determined based on the assumed hydraulic pressure output W cannot be appropriately carried out. Thus, the assist motor cannot be appropriately controlled. For example, the assist motor cannot appropriately compensate for a sudden load to thereby stall the engine. Further, as a result of useless driving of the assist motor, fuel consumption of the engine may increase or the rotational speed of the engine may unnecessarily vary to degrade the operability. In the above hybrid working machine, the output from the electric motor assisting the engine is controlled to supply outputs corresponding to the hydraulic load and the electrical load based on conditions of the engine and battery. In order to accurately control the output of the electric motor, it is necessary to accurately calculate the hydraulic load. When the error is included in the calculation of the hydraulic load, the assist amount of the electric motor cannot be appropriately determined. The error contained in the calculated hydraulic load may affect an output distribution (an energy distribution) between the engine and the electric motor. If the load on the engine becomes excessive, the fuel consumption of the engine may be increased. In this case, the engine may stall and the system may become inoperable. The operability of the working machine may be degraded because of the inoperable system.

An embodiment of the present invention has an object of appropriately controlling the assist motor based on an assumed hydraulic pressure output calculated in consideration of the various properties and degradation of the hydraulic pump.

Means for Solving Problems

In order to achieve the above-described objects, according to one embodiment of the present invention, there is provided a hybrid working machine including an engine; a variable displacement hydraulic pump connected to the engine; a motor generator connected to the engine; and a control unit controlling the motor generator, wherein the control unit acquires a calculation value of the hydraulic pump based on a pump current supplied to the hydraulic pump and a discharge pressure of the hydraulic pump using a predetermined algorithm, corrects a hydraulic pump characteristic parameter used in the predetermined algorithm based on an assumed pressure error between the calculation value and an actual value of the hydraulic pump, calculates an assumed hydraulic pressure correction output using the corrected hydraulic pump characteristic parameter, and controls the motor generator based on the assumed hydraulic pressure correction output.

Further, according to another embodiment of the present invention, there is provided a control method for a hybrid working machine in which a hydraulic pump having a discharge flow rate changing characteristic inherent in a control signal is driven by an output of an engine, including correcting the control signal to bring a characteristic of the hydraulic pump closer to the discharge flow rate changing characteristic inherent in the control signal; calculating the output of the hydraulic pump based on the output of the corrected control signal; and controlling an output of a motor generator assisting the engine based on the calculated output of the hydraulic pump.

Effect of the Invention

According to one embodiment of the present invention, it is possible to accurately calculate the assumed hydraulic pressure output of the hydraulic pump having a value close to the value of the actual hydraulic pressure output. Therefore, it is possible to control the assist motor based on the assumed hydraulic pressure output to thereby maintain the engine in a state of good operational efficiency.

Further, according to another embodiment of the present invention, the discharge flow rate of the hydraulic pump is calculated in consideration of the properties of the pump in a transient property such as a pump discharge flow rate, a pump discharge pressure, a control current and a negative control pressure of the hydraulic pump. Therefore, it is possible to appropriately control assisting of the electric motor based on the hydraulic load which was accurately calculated to thereby appropriately control the motor load.

BRIEF DESCRIPTION OF DRAWINGS

FIG. 5 illustrates a hydraulic pump efficiency map.

FIG. 9 illustrates updating data of the efficiency map;

DETAILED DESCRIPTION OF THE PREFERRED EMBODIMENTS

A description is given below, with reference to figures of embodiments of the present invention.

Figure 1:
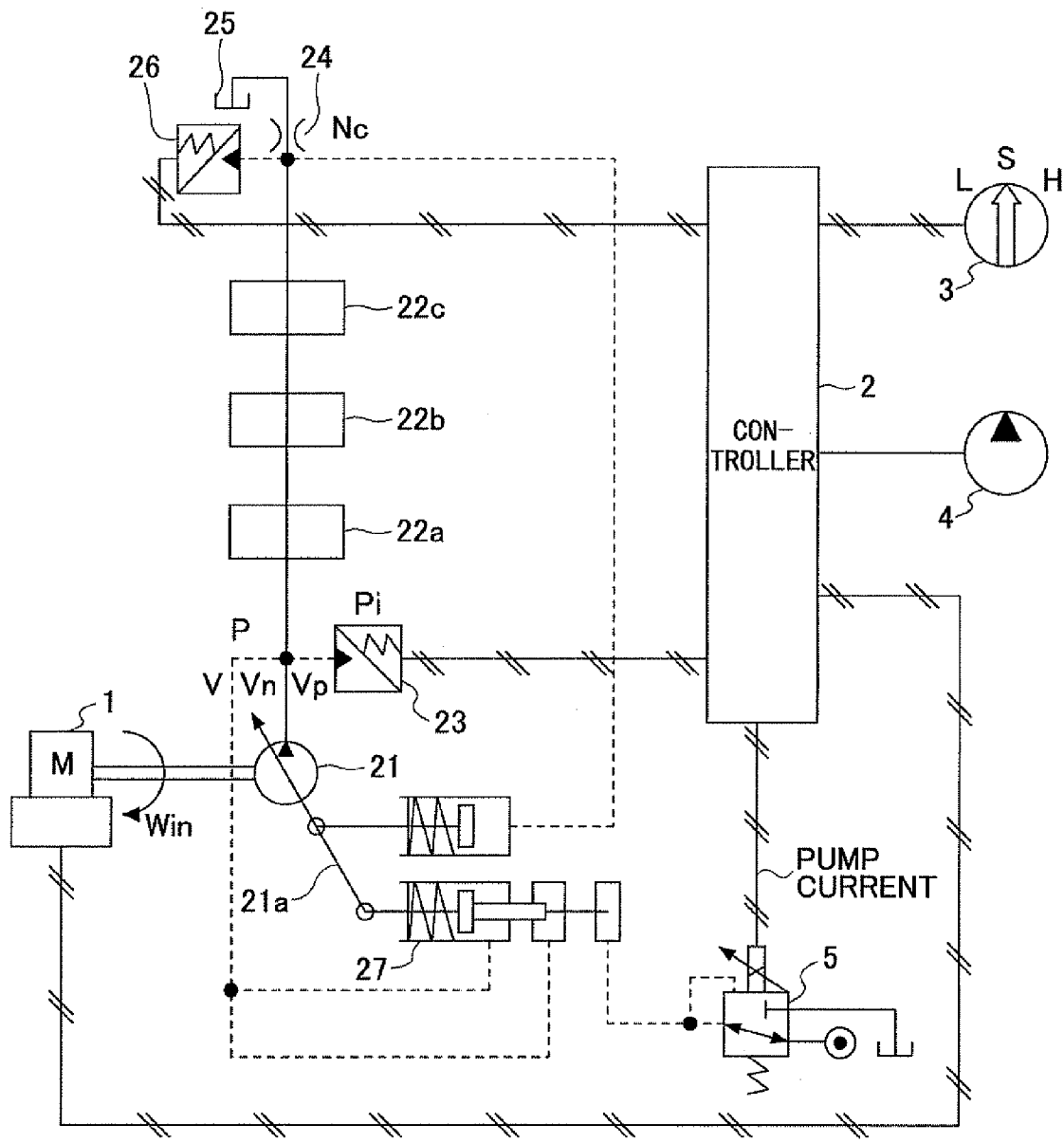
FIG. 1 illustrates a control circuit of a hydraulic shovel applied to the present invention.

First, a description is given of a controller of a hydraulic shovel, which is a hybrid working machine to which an output control method according to the embodiment is applied. FIG. 1 is a block diagram illustrating a control circuit of the hydraulic shovel to which the control method according to the embodiment is applied. The hybrid working machine to which the embodiment is applied is not limited to the hydraulic shovel.

First, a description is given of a configuration of the control circuit of the hydraulic shovel illustrated in FIG. 1. Directional control valves 22a, 22b, and 22c are connected to the oil passage of a variable displacement hydraulic pump (hereinafter simply referred to as "hydraulic pump") 21 driven by an engine motor 1. A pump discharge pressure sensor 23 is connected to the oil passage on the upstream side of the directional control valve 22a. The pump discharge pressure sensor 23 detects the discharge pressure of the hydraulic pump 21. Further, on the downstream side of the directional control valve 22c, the oil passage is connected to a tank 25 via a negative control metering valve (hereinafter, referred to as "nega-con metering valve") 24.

The variable displacement hydraulic pump 21 is, for example, a variable swash plate type hydraulic pump, and the pump output may be varied by changing the angle of a swash plate. That is, it is possible to vary the output of the hydraulic pump 21 by controlling the angle of the swash plate by changing a control current to the hydraulic pump 21.

A negative control sensor (hereinafter, "nega-con sensor") 26 is connected to the nega-con metering valve 24 on its upstream side. The nega-con sensor 26 is connected to a controller 2, and detects the hydraulic pressures of respective hydraulic pressure passages to the tank 25 to input the signals of the detected pressures to the controller 2.

A negative controller (hereinafter referred to as "nega con") including the nega-con metering valve 24, the nega-con sensor 26, and the controller 2 is a control system for reducing the loss of the discharge flow rate of the hydraulic pump 21 returning to the tank 25.

A mode selector 3 for switching to respective operation modes such as a heavy excavation mode (H mode), a standard excavation mode (S mode), and a finishing excavation mode (L mode) and a throttle volume 4 for setting the rotational speed of the engine are connected to the controller 2. Further, an electromagnetic proportional valve 5 and the pump discharge pressure sensor 23 are connected to the controller 2. Further, the electromagnetic proportional valve 5 is connected to a regulator 27, and the regulator 27 controls the discharge flow rate of the hydraulic pump 21.

Figure 2:
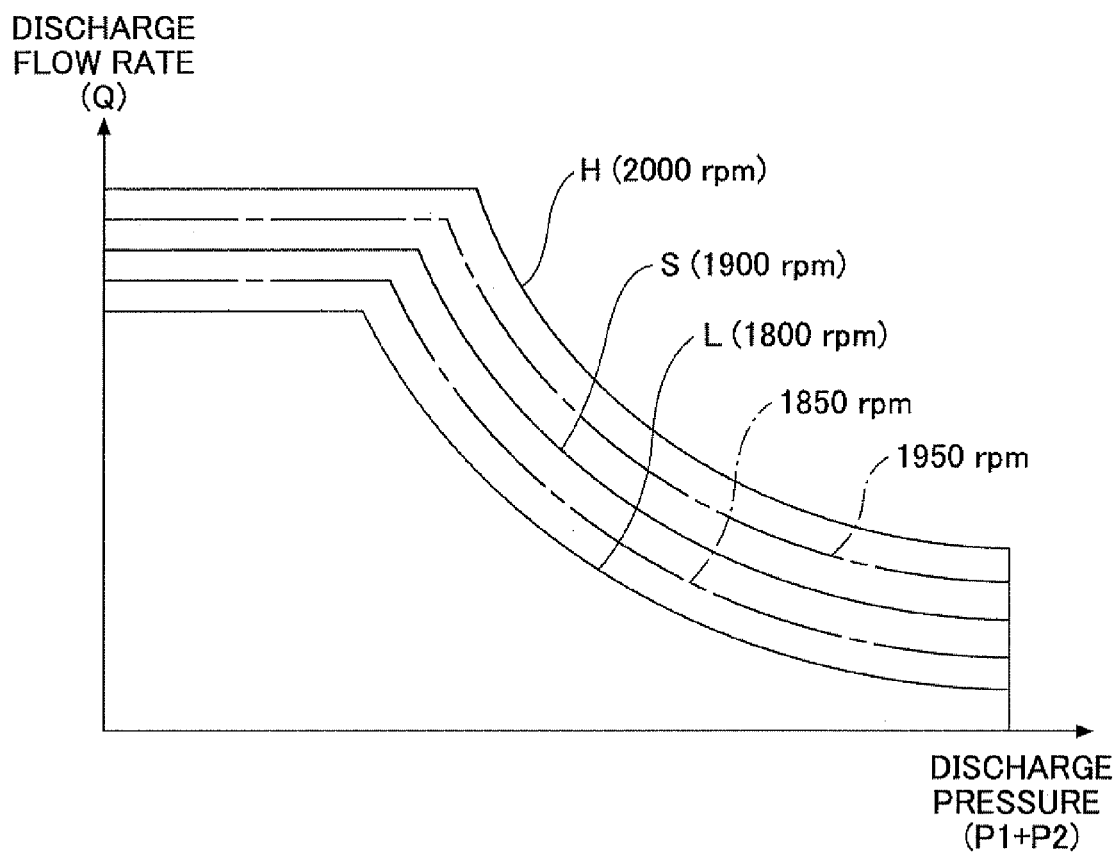
FIG. 2 is a characteristic diagram illustrating a relationship between the discharge pressure and discharge flow rate of a hydraulic pump realized by the control circuit of FIG. 1.

Ordinarily, the hydraulic shovel includes a switching mechanism for switching to respective modes such as the heavy excavation mode (H mode), the standard excavation mode (S mode), and the finishing excavation mode (L mode). The operation modes are appropriately switched by the controller 2 to change a pump current I by a switching operation of the mode selector 3. With such a switching mechanism of the control circuit, the tilting angle of the swash plate 21a is varied in accordance with the pump current I changed by the regulator 27. Thus, the discharge flow rate of the hydraulic pump 21 is controlled. Further, the input horsepower of the hydraulic pump 21 is varied by the electromagnetic proportional valve 5, and the rotational speed of the engine motor 1 is varied by the controller 2. Thus, the operation modes are switched over, and therefore the discharge pressure-discharge flow rate characteristic (P-Q characteristic) of the hydraulic pump is realized as illustrated in FIG. 2.

Then, the pump discharge quantity is controlled by the nega-con sensor 26, and a variation in a pump discharge pressure P is detected by the pump discharge pressure sensor 23. Thus, the quantity of discharge of the hydraulic pump 21 is controlled.

Figure 3:
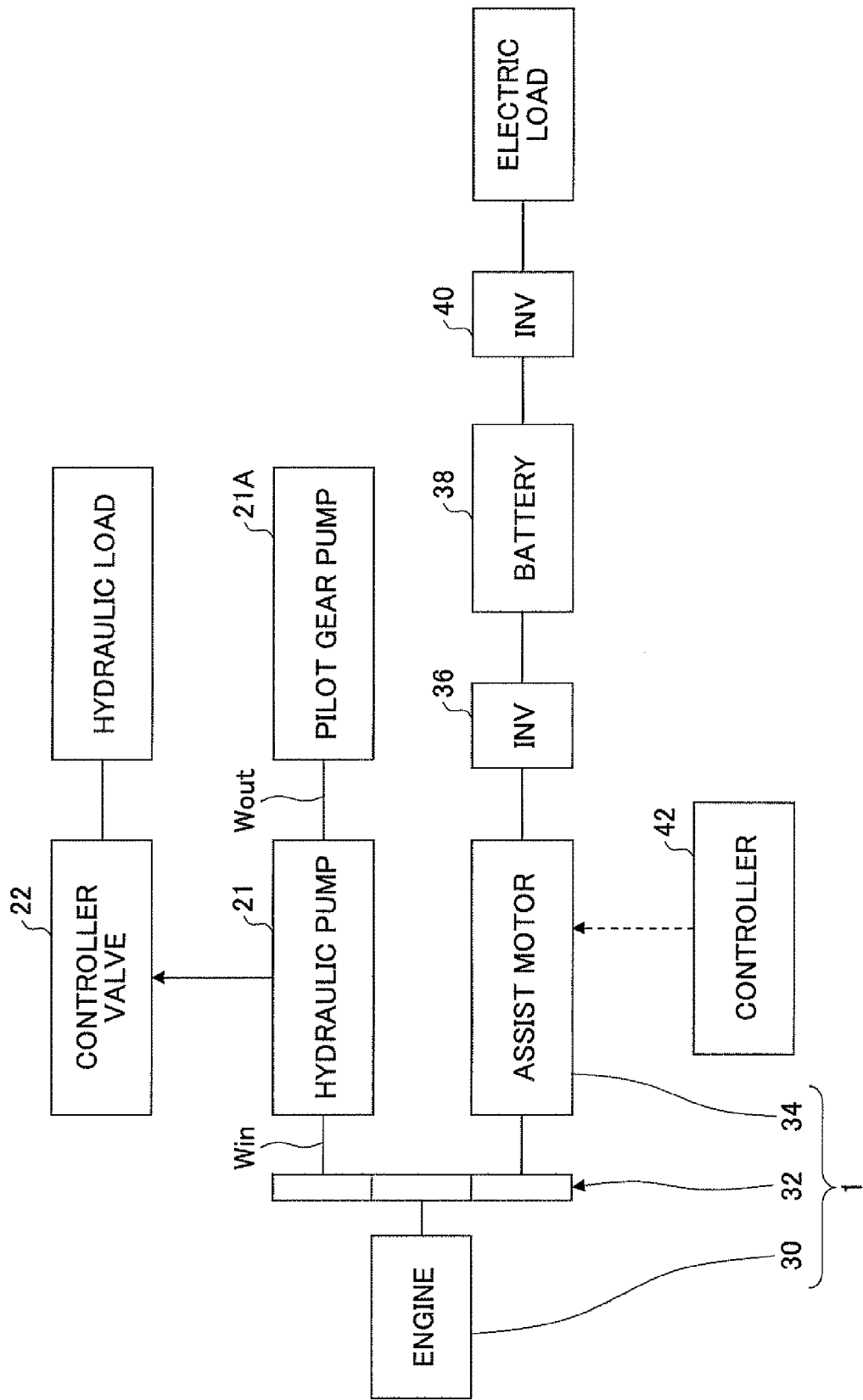
FIG. 3 is a block diagram of a drive system of the hydraulic shovel provided with a control circuit illustrated in FIG. 1.

FIG. 3 is a block diagram of a drive system of the hydraulic shovel provided with the control circuit illustrated in FIG. 1. An engine 30 such as an internal combustion engine and an assist motor 34 such as a motor generator are connected to a splitter 32, which is a power distributor. The engine 30, the assist motor 34, and the splitter 32 are included in the engine motor 1 illustrated in FIG. 1. The variable displacement hydraulic pump 21 is connected to the splitter 32 and driven by the output of the splitter 32 to thereby discharge high-pressure hydraulic fluid.

The hydraulic fluid discharged from the hydraulic pump 21 is sent to a controller valve 22 including the directional control valves 22a, 22b, and 22c illustrated in FIG. 1, and further supplied from the controller valve 22 to a hydraulic load including hydraulic cylinders and hydraulic motors. A pilot gear pump 21A for detecting and controlling hydraulic output is connected to the hydraulic pump 21. The output (power) Wout on the shaft output side of the hydraulic pump 21 may be determined based on pressure P and a discharge flow rate Q detected by this pilot gear pump 21A.

The assist motor 34 is connected via an inverter (INV) 36 to a battery 38, which is a charge storage device. The assist motor 34 is driven with the electric power supplied from the battery 38 to operate as an electric motor to assist the engine 30. Further, the assist motor 34 functions as a generator to charge the battery 38 by receiving engine power via the splitter 32. An electrical load including an electric motor and an electric actuator is connected to the battery 38 via an inverter (INV) 40 to operate with the electric power supplied from the battery 38.

In the system illustrated in FIG. 3, the operations of the engine 30, the assist motor 34, and the hydraulic pump 21 are controlled by a controller 42. In particular, the controller 42 precisely calculates an output (power) Win on the shaft input side of the hydraulic pump 21 and controls the output (assist amount) of the assist motor 34. Thus, the controller 42 maintains the output of the engine 30 constantly at an appropriate value and controls the engine 30 to prevent an abnormal operation of the engine and to be driven within a range of good efficiency.

Figure 4:
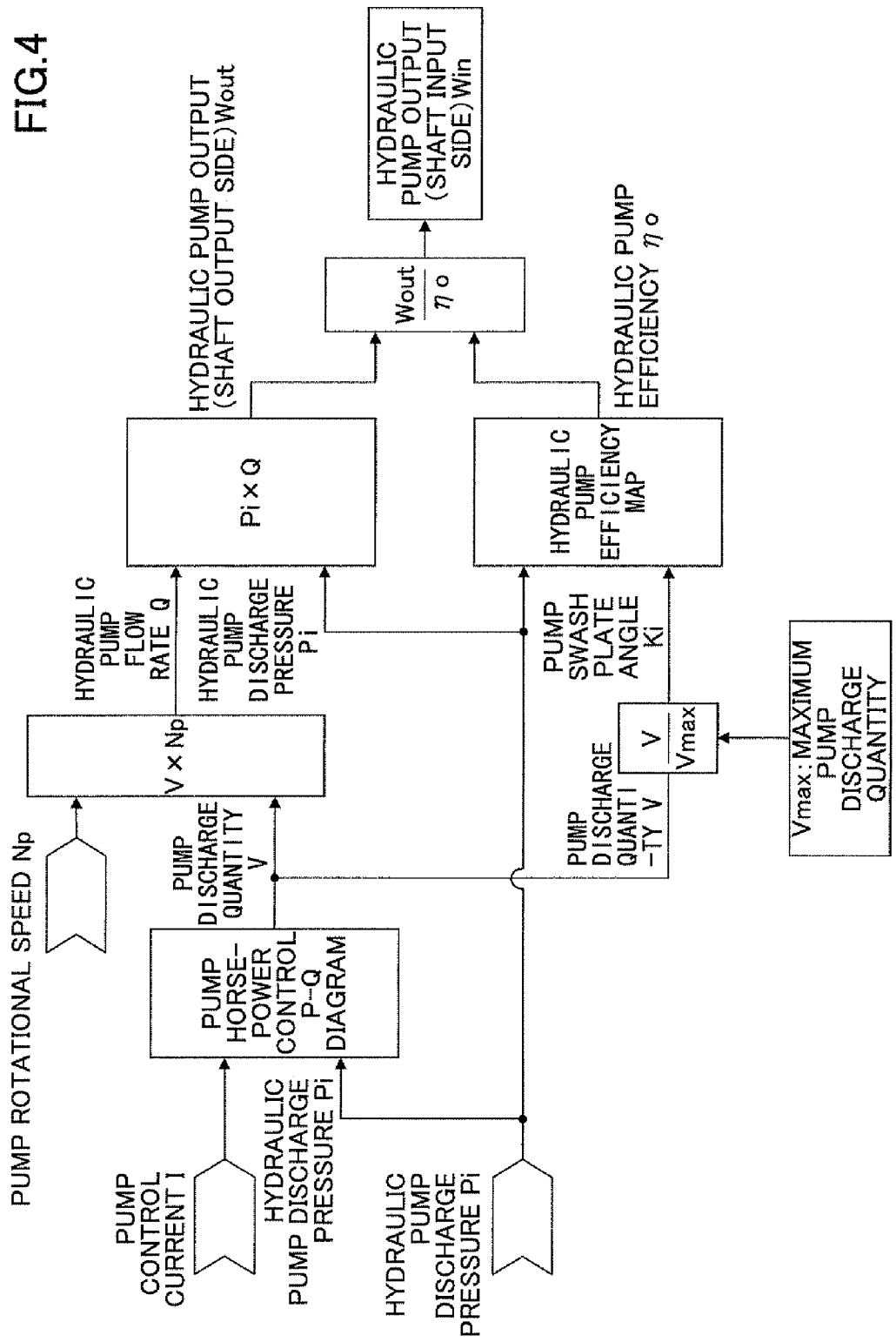
FIG. 4 illustrates a hydraulic load calculation algorithm.

Here, referring to FIG. 4, there is described an algorithm used when the controller 42 calculates the output (power) Win of the shaft input side of the hydraulic pump 21.

The hydraulic load corresponds to the hydraulic pump output on the shaft output side Wout, and is calculated as the product of a discharge pressure Pi and the discharge flow rate Q of the hydraulic pump 21 (Wout=Pi×Q). A value actually measured with the hydraulic sensor is used as the discharge pressure Pi. The discharge flow rate Q is calculated by multiplying a pump discharge quantity V by a pump rotational speed (rpm) Np. The pump discharge quantity V may be determined from the discharge pressure Pi and a control current I supplied to the hydraulic pump 21 based on a P-Q diagram illustrating the pump discharge pressure-pump discharge quantity characteristic of the hydraulic pump 21.

As described above, first, the pump discharge quantity V is determined from the pump horsepower control P-Q diagram using the discharge pressure Pi of the hydraulic pump 21 and the pump control current I, and the hydraulic pump flow rate Q is calculated by multiplying the determined pump discharge quantity V by the pump rotational speed (rpm) Np. Then, the hydraulic pump output on the shaft output side Wout is calculated by multiplying the calculated hydraulic pump flow rate Q by the discharge pressure Pi.

Next, the hydraulic pump output (on the shaft input side) Win is calculated by dividing the hydraulic pump output on the shaft output side Wout by a hydraulic pump efficiency ηo. By taking the hydraulic pump efficiency ηo into consideration, it is possible to accurately determine the hydraulic pump output (on the shaft input side) Win. The hydraulic pump efficiency ηo, which is subject to variation depending on the discharge pressure Pi of the hydraulic pump 21 and a swash plate angle Ki, may be a fixed value as an average within a variation range. However, in order to calculate the hydraulic pump output on the shaft input side Win with higher accuracy, it is preferable to calculate the hydraulic pump efficiency ηo based on the discharge pressure Pi of the hydraulic pump 21 and the swash plate angle Ki and to calculate the hydraulic pump output on the shaft input side Win by dividing the hydraulic pump output on the shaft output side Wout by the calculated value.

The hydraulic pump efficiency ηo may be determined based on a hydraulic pump efficiency map using the discharge pressure Pi and the swash plate angle Ki. The swash plate angle Ki is calculated by dividing the pump discharge quantity V determined from the above-described P-Q diagram by a pump maximum discharge quantity Vmax. Said differently, the hydraulic pump efficiency ηo may be accurately determined based on the hydraulic pump efficiency map using the calculated pump discharge quantity V and the discharge pressure Pi. The hydraulic pump efficiency map is created in advance by determining efficiency by driving the hydraulic pump while varying the discharge pressure and the swash plate angle. FIG. 5 is a diagram illustrating a hydraulic pump efficiency map. In the case illustrated in FIG. 5, the values of pump efficiency in the case of causing the discharge pressure to vary from P1 to Pn on the axis of ordinate and causing the pump swash plate angle to vary from K1 to Kn on the axis of abscissa are converted into a table. For example, if the pump swash plate angle is Kj and the pump discharge pressure is Pj, the intersection point η(j,j) of the column of the pump swash plate angle Kj and the row of the pump discharge pressure Pj is determined as the pump efficiency.

Referring to FIG. 4, by dividing the hydraulic pump output on the shaft output side Wout by the hydraulic pump efficiency go, it is possible to accurately estimate and obtain the hydraulic pump output on the shaft input side Win. The estimated and obtained hydraulic pump output on the shaft input side Win corresponds to power input into the hydraulic pump 21. The power input into the hydraulic pump 21 is the sum of the output of the engine 30 and the output of the assist motor 34. Therefore, by controlling the output of the assist motor 30 so that the sum of the output of the engine 30 and the assist motor 34 becomes the hydraulic pump output on the shaft input side Win, the output of the engine 30 (i.e., load on the engine 30) can be accurately controlled. Therefore, it is possible to control the engine so that the load on the engine 30 becomes constantly an appropriate load. Thus, the engine 30 can be driven with high efficiency.

Although the hydraulic load estimating algorithm does not consider the negative control pressure (nega-con pressure) Nc, by considering the nega-con pressure Nc, the assumed hydraulic pressure output, namely the hydraulic pump output on shaft input side Win can be obtained.

Figure 6:
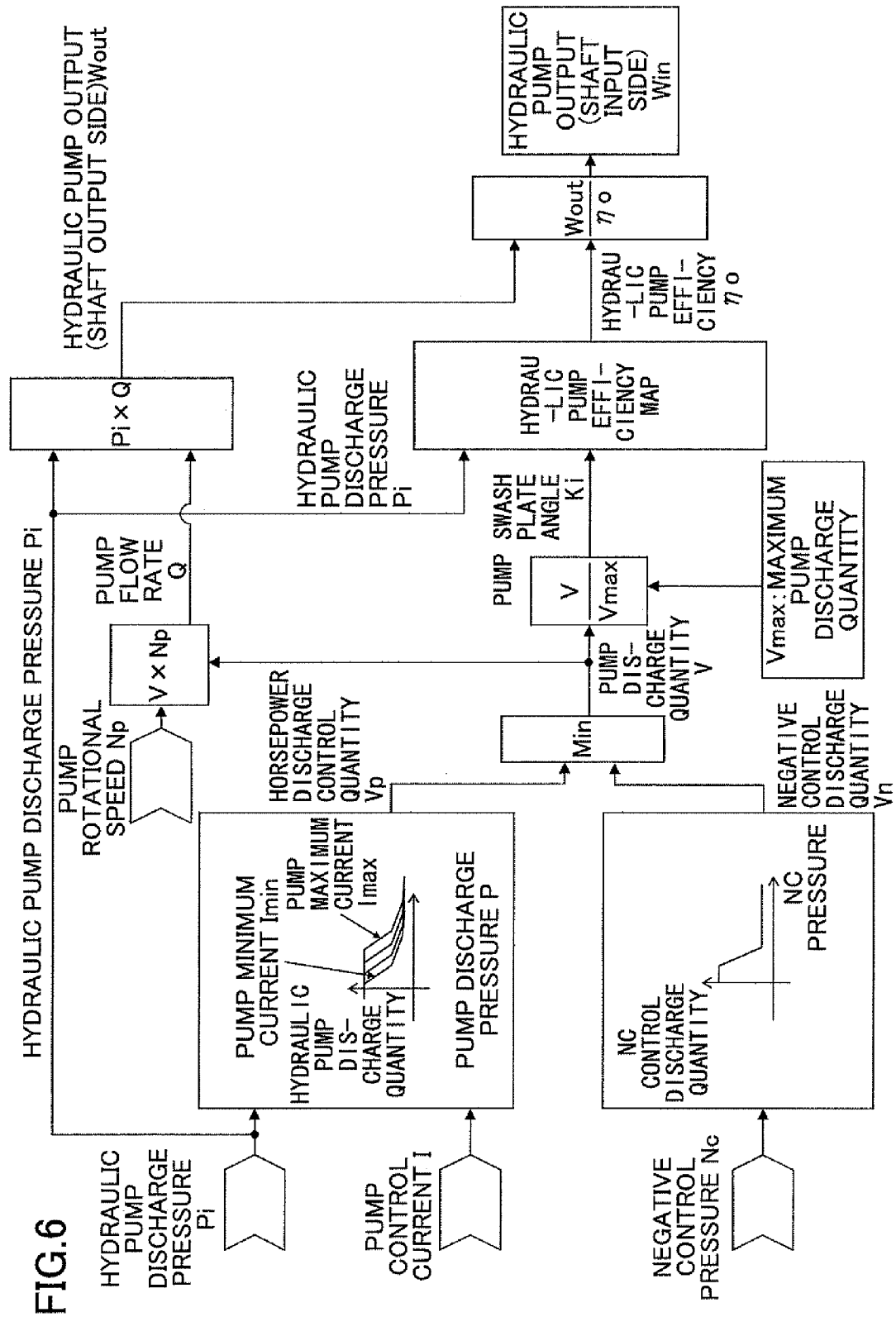
FIG. 6 illustrates a hydraulic load calculation algorithm in consideration of a negative control pressure.

FIG. 6 illustrates an algorithm used to calculate the assumed hydraulic pressure output Wi in consideration of the nega-con pressure Nc. If the nega-con pressure Nc is considered, the process for obtaining the pump discharge quantity V is different from the algorithm used to calculate the assumed hydraulic pressure output illustrated in FIG. 4. Therefore, the process for obtaining the discharge quantity V is described.

When the pump discharge quantity V is obtained, the discharge quantity Vp is acquired using the P-Q diagram in reference of the hydraulic pump discharge pressure Pi and the pump control current I and simultaneously a nega-con discharge quantity Vn is acquired. Referring to FIG. 1, the horsepower control discharge quantity Vp is a discharge quantity of the pump 21 calculated based on the discharge pressure Pi. The nega-con discharge quantity Vn is a discharge quantity of the pump 21 calculated based on the nega-con pressure No. In the algorithm used to calculate the assumed hydraulic pressure output illustrated in FIG. 4, the horsepower control discharge quantity Vp is determined to be the pump discharge quantity V.

In the P-Q diagram illustrated in FIG. 6, the axis of abscissa represents the discharge pressure P and the axis of ordinate represents the horsepower control discharge quantity Vp. The discharge pressure P of the hydraulic pump 21 is inversely proportional to the horsepower control discharge quantity Vp, and the P-Q diagram is changed by the pump control current I. In this P-Q diagram, if the pump control current I and the discharge pressure P are determined, the horsepower control discharge quantity Vp is obtainable.

The nega-con discharge quantity Vn is obtained by referring to the corresponding negative control pressure Nc in the negative control pressure-discharge quantity characteristic diagram. By finding the negative control pressure in the negative control pressure-discharge quantity characteristic diagram illustrated in FIG. 6, the corresponding nega-con discharge quantity Vn is obtainable.

The pump discharge quantity V becomes the smaller one of the horsepower control discharge quantity Vp and the nega-con discharge quantity Vn. The obtained pump discharge quantity V is used to calculate the hydraulic pump output on the shaft output side Wout and the hydraulic pump efficiency ηo. Thus, the assumed hydraulic pressure output Win can be accurately calculated.

In the above-described algorithm used to calculate the assumed hydraulic pressure output, the hydraulic pump efficiency ηo is obtained from the hydraulic pump efficiency map illustrated in FIG. 5. The hydraulic pump efficiency map is obtained by operating a hydraulic pump in advance and acquiring the efficiency. However, variation of the output characteristics of hydraulic pumps is not considered. The assumed hydraulic pressure output Win acquired from the hydraulic pump efficiency map does not exactly correspond to the various hydraulic pumps on the shaft input sides. Specifically, the hydraulic pumps deteriorate as an operating time passes by. Then, the output characteristics of the hydraulic pumps change. The changes of the output characteristics of the hydraulic pumps cause changes of the hydraulic pump efficiencies.

As described, if the hydraulic pump efficiency obtained from the hydraulic pump efficiency map differs from the actual hydraulic pump efficiency, an error ΔW is caused between the assumed hydraulic pressure output acquired with the algorithm of assumed hydraulic pressure output and the actual hydraulic pump output on the shaft input side (actual hydraulic pressure output Wact). Therefore, the motor generator 34 does not accurately assist the engine 30 to thereby cause insufficient charging of the battery 38.

In Embodiment 1, the error of the assumed hydraulic pressure output between the assumed hydraulic pressure output and the actual hydraulic pressure output is acquired, and data of the hydraulic pump efficiency map are updated based on the acquired error of the assumed hydraulic pressure output to thereby calculate an assumed hydraulic pressure output closer to the actual value.

Figure 7:
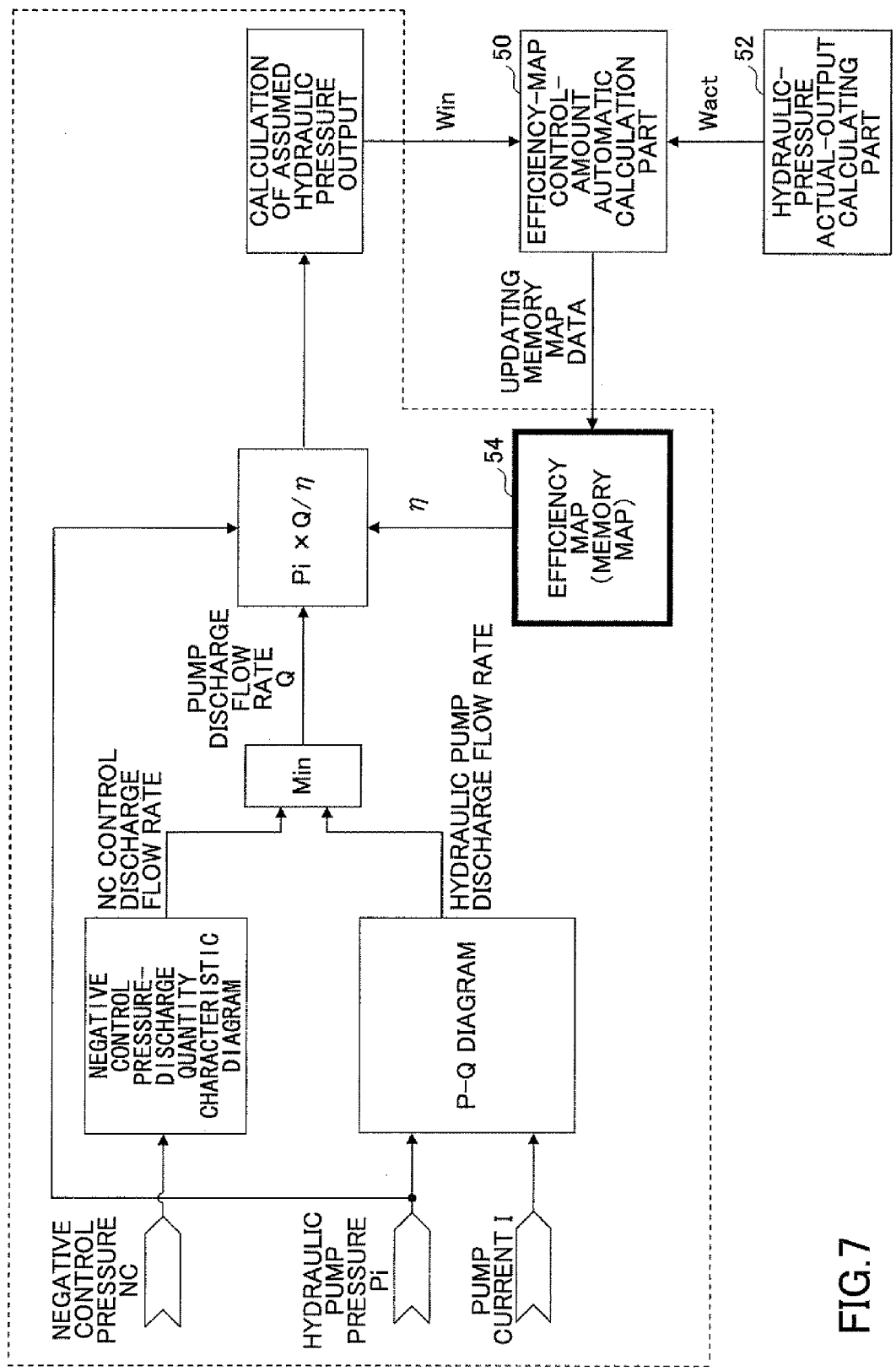
FIG. 7 illustrates a calculation algorithm of an assumed hydraulic pressure output of Embodiment 1 of the present invention.

FIG. 7 illustrates a calculation algorithm of an assumed hydraulic pressure output of Embodiment 1 of the present invention. A part of the algorithm from a negative control pressure NC, a hydraulic pump pressure Pi and a pump current I to calculation of an assumed hydraulic pressure output Win, surrounded by a dotted line in FIG. 7 is the same as the algorithm used to calculate the assumed hydraulic pressure output illustrated in FIG. 6. In Embodiment 1, the assumed hydraulic pressure output Win is supplied to an efficiency-map control-amount automatic calculation part 50. An actual hydraulic pressure output Wact acquired by the actual hydraulic pressure output calculating part 52 is supplied to the efficiency-map control-amount automatic calculation part 50.

The actual hydraulic pressure output calculating part 52 acquires the actual hydraulic pressure output Wact as the actual value in the hydraulic pump by subtracting a splitter loss, an engine loss and an assist motor loss from the sum of the actual output of the engine measured in the output shaft of the engine 30 and the assist motor output measured in the output shaft of the assist motor 34. Said differently, the actual hydraulic pressure output calculating part 52 acquires the actual hydraulic pressure output Wact using the following formula and the acquired actual hydraulic pressure output Wact is supplied to the efficiency-map control-amount automatic calculation part 50:

actual hydraulic pressure output Wact=engine output+
assist motor output (splitter loss+engine loss+
assist motor loss)

Figure 8:
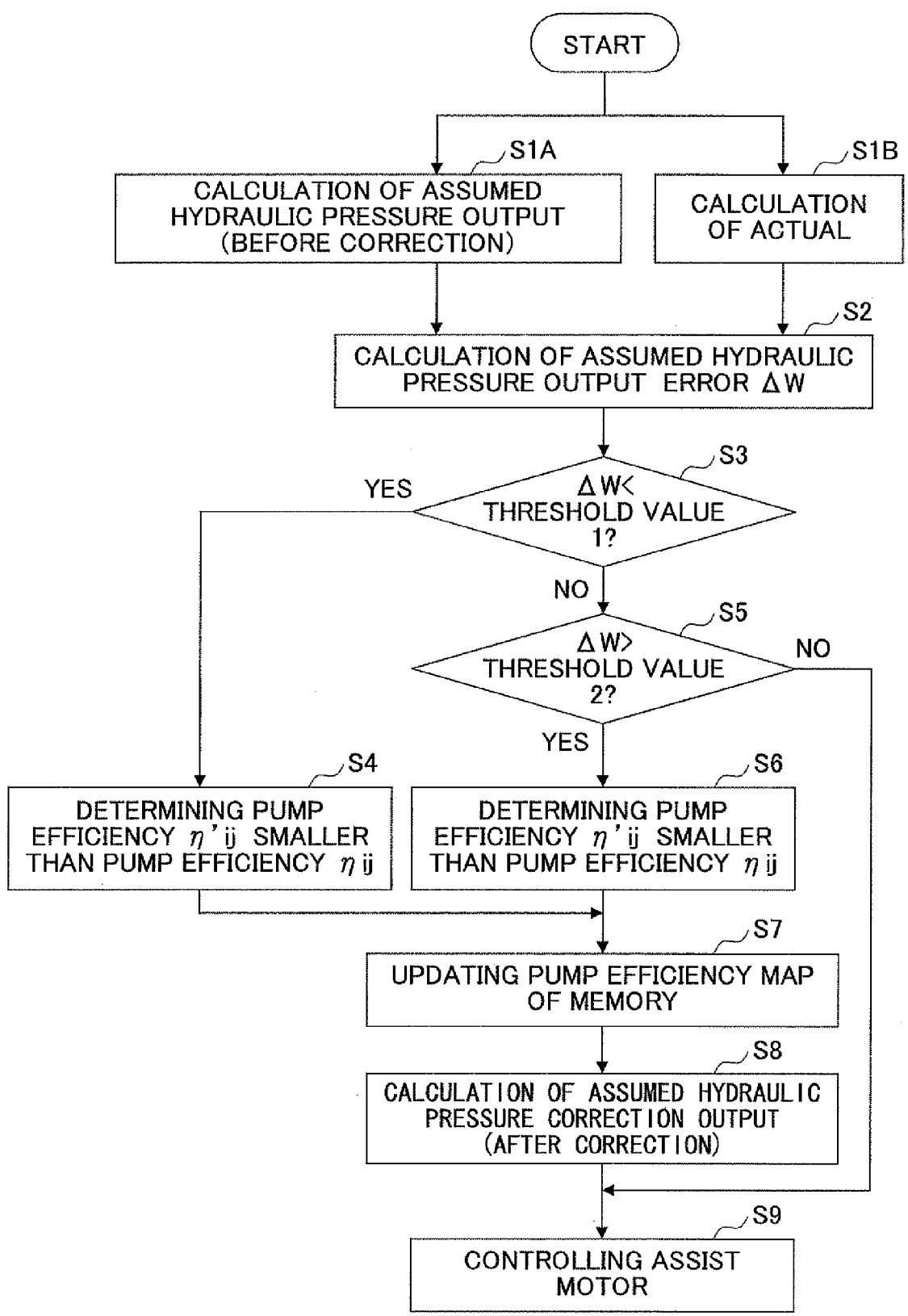
FIG. 8 is a flowchart of an efficiency map automatic adjusting process.

The efficiency-map control-amount automatic calculation part 50 subtracts the actual hydraulic pressure output Wact from the assumed hydraulic pressure output Win to acquire the error $\Delta W$ of the assumed hydraulic pressure output. If the assumed hydraulic pressure output Win is less than the actual hydraulic pressure output Wact, the error $\Delta W$ of the assumed hydraulic pressure output becomes a negative value (smaller than zero). If the assumed hydraulic pressure output Win is greater than the actual hydraulic pressure output Wact, the error $\Delta W$ of the assumed hydraulic pressure output becomes a positive value (greater than zero). If the acquired error $\Delta W$ of the assumed hydraulic pressure output is great enough, the efficiency-map control-amount automatic calculation part 50 updates data of the hydraulic pump efficiency map 54 to adjust the hydraulic pump efficiency $\eta$ used in the algorithm used to calculate the assumed hydraulic pressure output so as to be closer to the actual hydraulic pump efficiency. FIG. 8 is a flowchart of an efficiency map automatic adjusting process processed by the efficiency-map control-amount automatic calculation part 50. When the efficiency map automatic adjusting process is started, the processes of step S1A and step S1B are started. In step S1A, the pump current Ii, the pump discharge pressure Pi and the pump efficiency $\eta_{ij}$ acquired from the efficiency map 54 are used to calculate the assumed hydraulic pressure output Win with the algorithm used to calculate the assumed hydraulic pressure output. In step S1B, the actual hydraulic pressure output Wact is calculated by the actual hydraulic pressure output calculating part 52 using the engine output and the assist motor output.

In step S2, the efficiency-map control-amount automatic calculation part 50 subtracts the actual hydraulic pressure output Wact calculated in step S1B from the assumed hydraulic pressure output Wi calculated in step S1A to thereby calculate the error $\Delta W$ of the assumed hydraulic pressure output. In step S3, the efficiency-map control-amount automatic calculation part 50 determines whether the error $\Delta W$ of the assumed hydraulic pressure output is smaller than a preset threshold value 1 (negative value).

If it is determined that the error $\Delta W$ of the assumed hydraulic pressure output is smaller than the threshold value 1 (negative value), the process goes to step S4. In step S4, the efficiency-map control-amount automatic calculation part 50 determines the pump efficiency $\eta'_{ij}$ having a value smaller than that of the pump efficiency $\eta_{ij}$ used in step S1A. If it is determined that the error $\Delta W$ of the assumed hydraulic pressure output is smaller than the threshold value 1 (negative value), the assumed hydraulic pressure output Win is substantially less than the actual hydraulic pressure output Wact. Therefore, in order to correct the assumed hydraulic pressure output Win to be equal to or close to the actual hydraulic pressure output Wact, the pump efficiency $\eta$ being the denominator of Win=(Pi×Q)/$\eta$ may be decreased to increase the calculated result of Win. The value of the pump efficiency $\eta'_{ij}$ smaller than that of the pump efficiency $\eta_{ij}$ may be previously set in response to the magnitude of the error $\Delta W$ of the assumed hydraulic pressure output.

In the hydraulic pump efficiency map 54, the pump efficiency $\eta$ determined by the discharge pressure P and the swash plate angle K as illustrated in FIG. 5 are stored. Therefore, in step S4, there is determined the pump efficiency $\eta'_{ij}$ less than the pump efficiency $\eta_{ij}$ determined by the discharge pressure Pi and the pump swash plate angle Kj.

If it is determined that the error $\Delta W$ of the assumed hydraulic pressure output is the threshold value 1 (positive value) or more in step S3, the process goes to step S5. In step S5, the efficiency-map control-amount automatic calculation part 50 determines whether the error $\Delta W$ of the assumed hydraulic pressure output is greater than a preset threshold value 2 (positive value).

If it is determined that the error $\Delta W$ of the assumed hydraulic pressure output is greater than the threshold value 2 (positive value), the process goes to step S6. In step S6, the efficiency-map control-amount automatic calculation part 50 determines the pump efficiency $\eta'_{ij}$ having a value greater than that of the pump efficiency $\eta_{ij}$ used in step S1A. If it is determined that the error $\Delta W$ of the assumed hydraulic pressure output is greater than the threshold value 2 (positive value), the assumed hydraulic pressure output Win is substantially greater that the actual hydraulic pressure output Wact. Therefore, in order to correct the assumed hydraulic pressure output Win to be equal to or close to the actual hydraulic pressure output Wact, the pump efficiency $\eta$ being the denominator of Win=(Pi×Q)/$\eta$ may be increased to decrease the calculated result of Win. The value of the pump efficiency $\eta'_{ij}$ smaller than the value of the pump efficiency $\eta_{ij}$ may be previously set in response to the magnitude of the error $\Delta W$ of the assumed hydraulic pressure output.

In the hydraulic pump efficiency map 54, the pump efficiency $\eta$ determined by the discharge pressure P and the swash plate angle K as illustrated in FIG. 5 is stored. Therefore, in step S6, there is determined the pump efficiency $\eta'_{ij}$ greater than the pump efficiency $\eta_{ij}$ determined by the discharge pressure Pi and the pump swash plate angle Kj.

If the pump efficiency $\eta'_{ij}$ less or greater than the pump efficiency $\eta_{ij}$ is determined in step S4 or step S6, the process goes to step S7. In step S7, the efficiency-map control-amount automatic calculation part 50 sends data of the pump efficiency $\eta'_{ij}$ to the hydraulic pump efficiency map 54 and rewrites the pump efficiency $\eta_{ij}$ in the hydraulic pump efficiency map 54 with the pump efficiency $\eta'_{ij}$. At this time, referring to FIG. 9, it is preferable to rewrite pump efficiencies $\eta_{i-1, j-1}$ to $\eta_{i+1, j+1}$ with pump efficiencies $\eta'_{i-1, j-1}$ to $\eta'_{i+1, j+1}$ smaller than the pump efficiencies $\eta_{i-1, j-1}$ to $\eta_{i+1, j+1}$.

In the algorithm used to calculate the assumed hydraulic pressure output, the hydraulic pump efficiency map to be adjusted corresponds to a hydraulic pump characteristic parameter.

The process up to step S7 corresponds to the efficiency map automatic adjustment process. If the pump efficiency map stored in the memory is updated in step S7, the process goes to step S8. In step S8, the pump current Ii, the pump discharge pressure Pi and the pump efficiency $\eta'_{ij}$ acquired from the rewritten efficiency map 54 are used to calculate the assumed hydraulic pressure output Win with the algorithm used to calculate the assumed hydraulic pressure output. The assumed hydraulic pressure output Win calculated in step S8 is calculated based on the rewritten pump efficiency $\eta'_{ij}$ and has a value close to the actual pump output.

Thereafter, in step S9, the assumed hydraulic pressure output Win calculated in step S8 is used to control the operation of the assist motor 34. Since the assumed hydraulic pressure output Win is close to the actual pump output, it is possible to appropriately control the operation of the assist motor 34 to maintain the load of the engine 30 in an appropriate condition.

If it is determined that the error $\Delta W$ of the assumed hydraulic pressure output is smaller than the threshold value 2 (positive value), the pump efficiency map is not updated and the process goes to step S9. Therefore, the assumed hydraulic pressure output Win calculated in step S1A is used in the process of step S9.

With the above explanation, the hydraulic pump 21 is controlled and driven with the negative control (i.e., nega-con). There are other drive and control methods called positive control (i.e., posi-con) and load sensing control.

Figure 10:
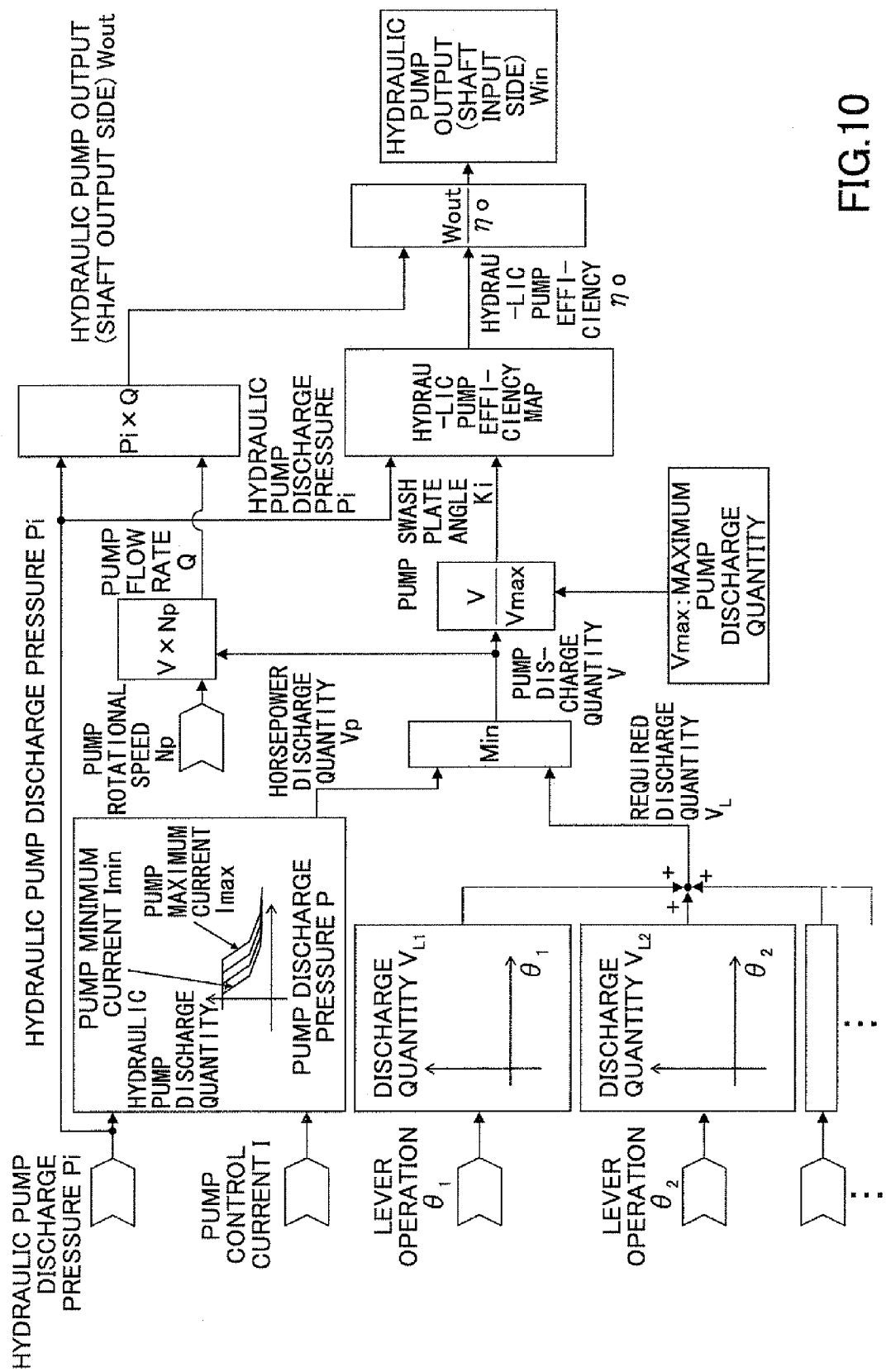
FIG. 10 illustrates a calculation algorithm of a hydraulic load used in calculating the output (power) on the shaft input side in a case where the control circuit of the pump is formed to carryout positive control.

The positive control for driving the hydraulic pump 21 is described. FIG. 10 illustrates a hydraulic load estimating algorithm used in calculating the hydraulic pump output (power) on the shaft input side in a case where the control circuit of the pump is formed to carryout the positive control. In the case of the positive control, the process for obtaining the pump discharge quantity V is different from the hydraulic load estimating algorithm for the negative control illustrated in FIG. 4 and the other process is the same. Therefore, the process for obtaining the discharge quantity V is described next.

When the positive control is carried out, discharge quantities $V_{L1}$, $V_{L2}$ ... required in the hydraulic pump 21 corresponding to lever operation amounts $\theta_1$, $\theta_2$ ... of an operation lever operated by a driver to drive a hydraulic drive portion are obtained from a map indicating a relationship between the lever operation amounts $\theta_1$, $\theta_2$ ... and the discharge quantities $V_{L1}$, $V_{L2}$ .... The sum of the discharge quantities $V_{L1}$, $V_{L2}$ ... becomes a required discharge quantity $V_L$ required for the hydraulic pump 21.

Figure 11:
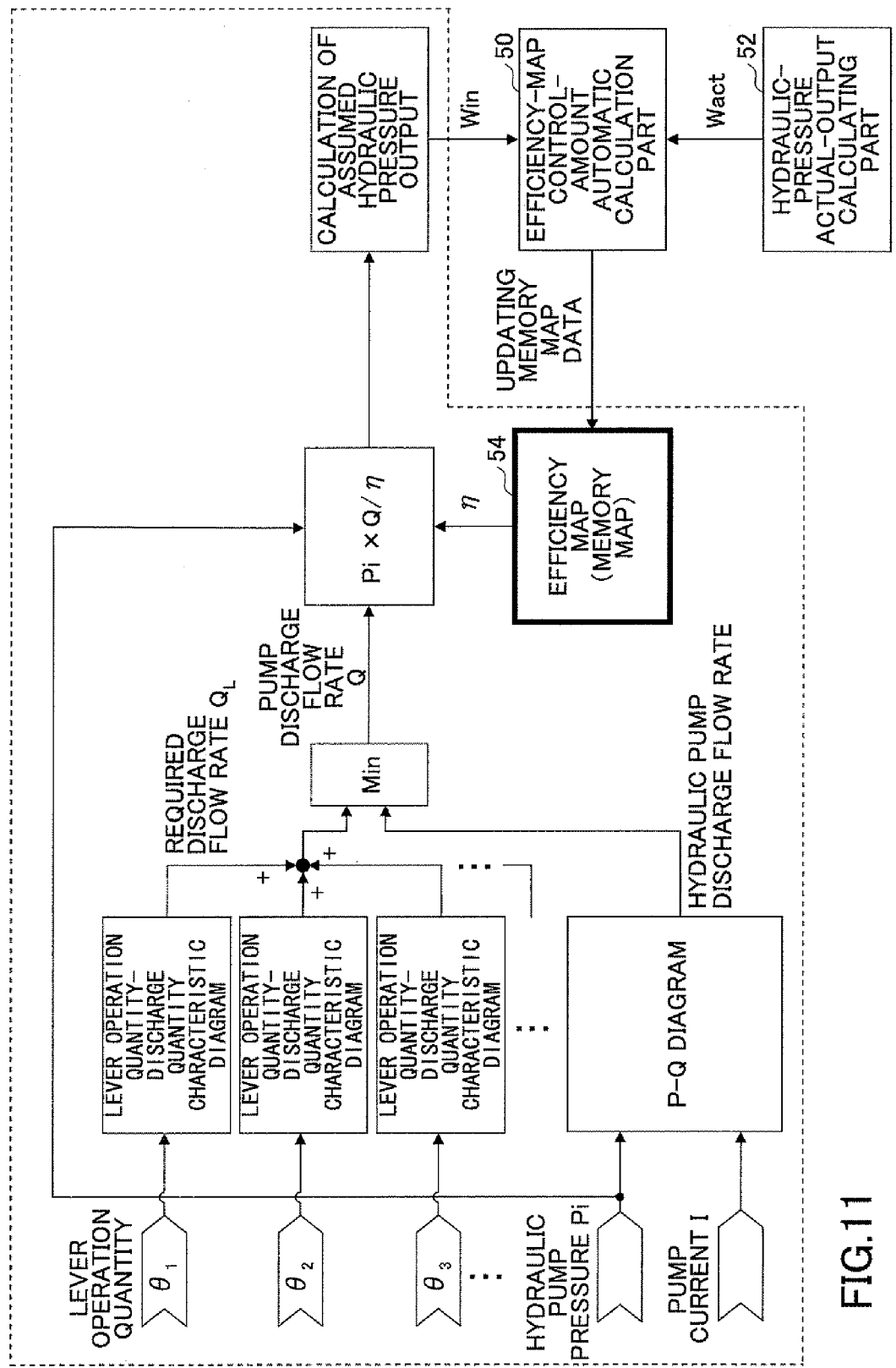
FIG. 11 illustrates a calculation algorithm of the hydraulic load used in calculating the assumed hydraulic pressure output in a case where the positive control is carried out.

The pump discharge quantity V becomes the smaller one of the horsepower control discharge quantity Vp and the required discharge quantity $V_L$. By using the pump discharge quantity V acquired as described for calculating the hydraulic pump output on the shaft output side Wout and the hydraulic pump efficiency $\eta$o, the assumed hydraulic pressure output (hydraulic pump output on the shaft input side) Win can be calculated with the algorithm illustrated in FIG. 11.

Figure 12:
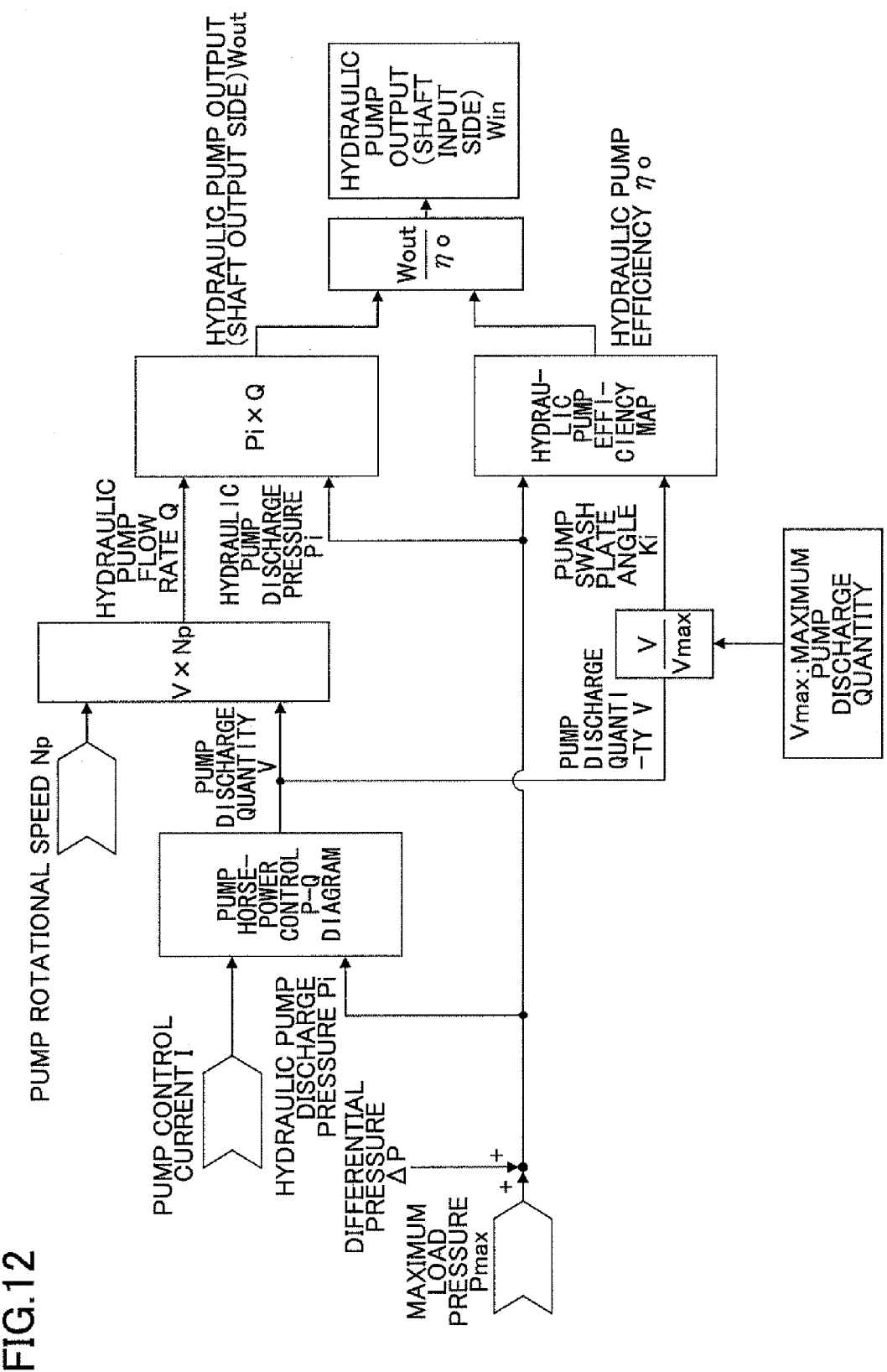
FIG. 12 illustrates a calculation algorithm of the hydraulic load used in calculating the output (power) on the shaft input side in a case where the control circuit of the pump is formed to carry out load sensing control.

The load sensing control for driving the hydraulic pump 21 is described next. FIG. 12 illustrates a hydraulic load calculation algorithm used in calculating the hydraulic pump output (power) on the shaft input side in a case where the control circuit of the pump is formed to carry out the load sensing control. In the case of the load sensing control, the process for obtaining the pump discharge quantity V is different from the hydraulic load estimating algorithm illustrated in FIG. 4 and the other process is the same. Therefore, the process for obtaining the discharge quantity V is described.

Figure 13:
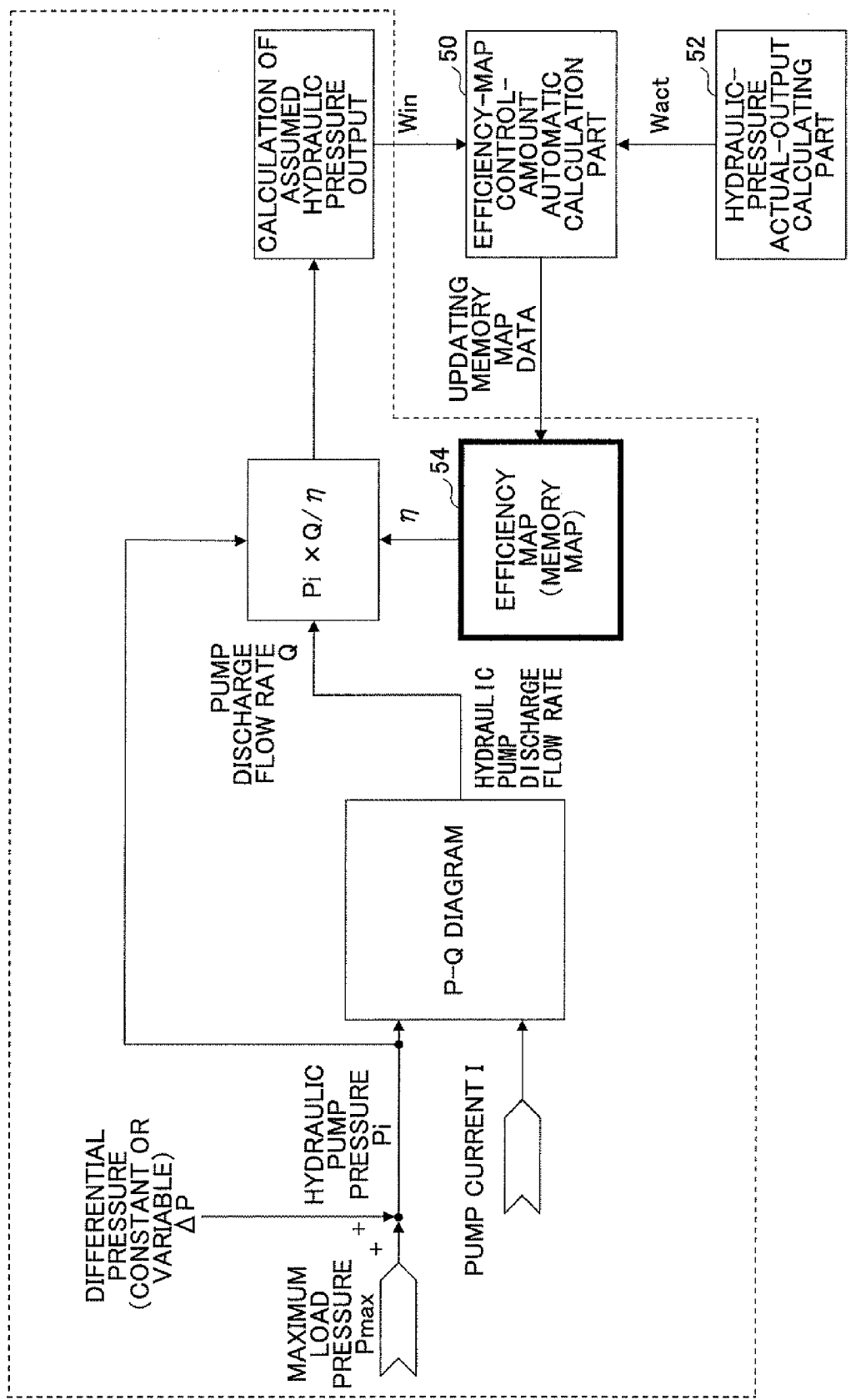
FIG. 13 illustrates a calculation algorithm of a hydraulic load used in calculating the assumed hydraulic pressure output in a case where the load sensing control is carried out.

In the load sensing control, the hydraulic pump discharge pressure Pi illustrated in FIG. 4 is determined by adding the differential pressure $\Delta P$ to the maximum load pressure Pmax. The differential pressure $\Delta P$ is added to give a certain margin to the pump discharge quantity. The differential pressure $\Delta P$ may be a constant value or variable value. The pump discharge quantity V may be determined from the discharge pressure Pi and the pump current (control current) I supplied to the hydraulic pump 21 based on the P-Q diagram illustrating the pump discharge pressure-pump discharge quantity characteristic of the hydraulic pump 21. By using the pump discharge quantity V acquired as described for calculating the hydraulic pump output on the shaft output side Wout and the hydraulic pump efficiency $\eta$o, the assumed hydraulic pressure output (hydraulic pump output on the shaft input side) Win can be calculated with the algorithm illustrated in FIG. 13.

Figure 14:
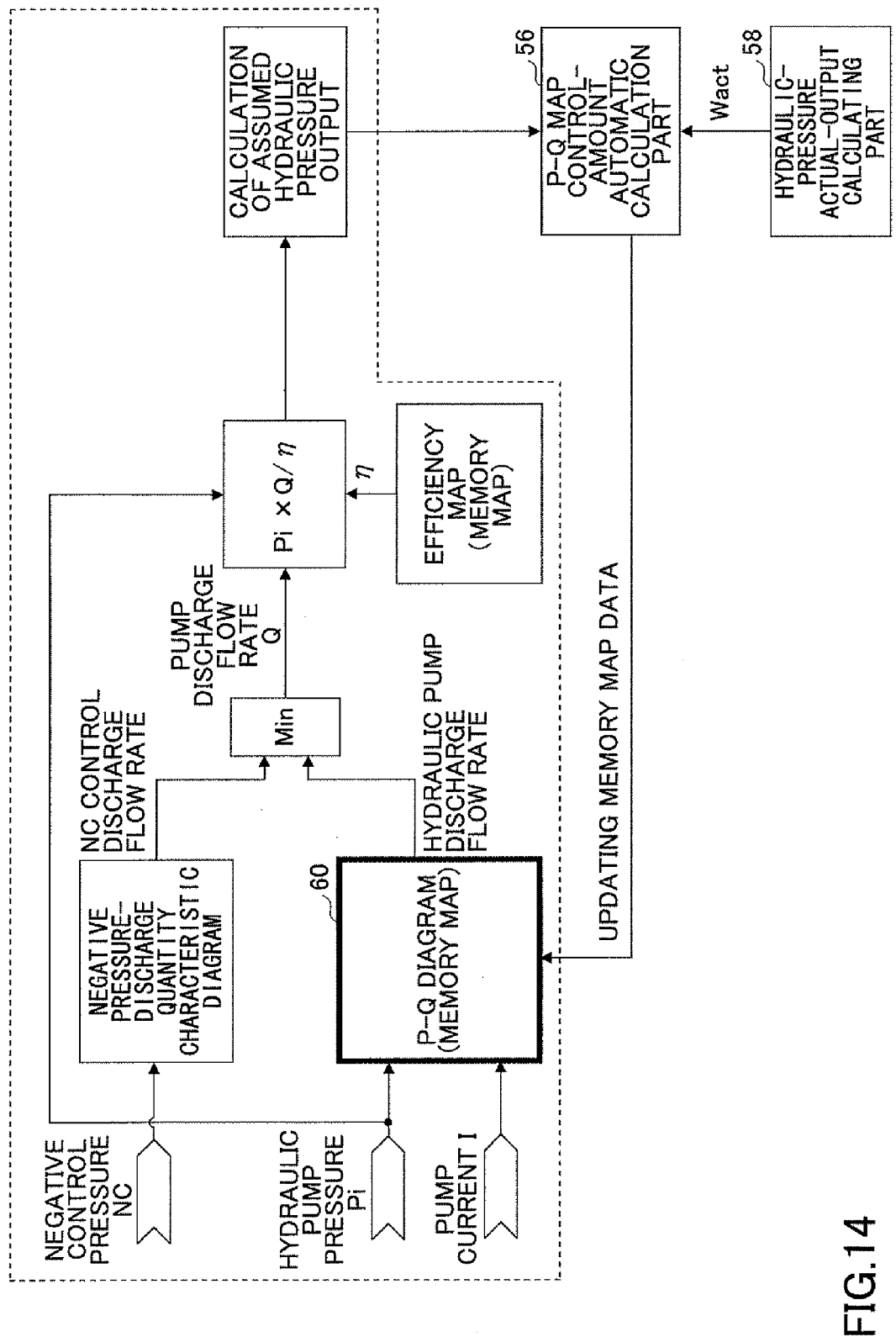
FIG. 14 illustrates a calculation algorithm of an estimated hydraulic pressure output of Embodiment 2 of the present invention.

Next, an algorithm used to calculate an assumed hydraulic pressure output according to Embodiment 2 is described. FIG. 14 illustrates the algorithm used to calculate the assumed hydraulic pressure output of Embodiment 2 of the present invention. A part of the algorithm from a negative control pressure NC, a hydraulic pump pressure Pi and a pump current I for calculation of an assumed hydraulic pressure output Win, surrounded by a dotted line in FIG. 14 is the same as the algorithm used to calculate the assumed hydraulic pressure output illustrated in FIG. 7. In Embodiment 2, the assumed hydraulic pressure output Win calculated for the hydraulic pump is supplied to a P-Q map control-amount automatic calculation part 56. The actual hydraulic pressure output Wact acquired by an actual hydraulic pressure output calculating part 58 is supplied to the P-Q map control-amount automatic calculation part 56.

The actual hydraulic pressure output calculating part 58 has a function similar to the actual hydraulic pressure output calculating part 52 illustrated in FIG. 7. The actual hydraulic pressure output calculating part 58 acquires the actual hydraulic pressure output Wact as a hydraulic pump actual value by subtracting the splitter loss, the engine loss and the assist motor loss from the sum of an engine actual output measured in the engine output shaft and an assist motor output measured in the assist motor output shaft, and supplies the acquired actual hydraulic pressure output Wact to the P-Q map control-amount automatic calculation part 56.

The P-Q map control-amount automatic calculation part 56 subtracts the actual hydraulic pressure output Wact from the assumed hydraulic pressure output Win to acquire an error $\Delta W$ of the assumed hydraulic pressure output. If the assumed hydraulic pressure output Win is less than the actual hydraulic pressure output Wact, the error $\Delta W$ of the assumed hydraulic pressure output becomes a negative value (smaller than zero). If the assumed hydraulic pressure output Win is greater than the actual hydraulic pressure output Wact, the error $\Delta W$ of the assumed hydraulic pressure output becomes a positive value (greater than zero). If the acquired error $\Delta W$ of the assumed hydraulic pressure output is great enough, the P-Q map control-amount automatic calculation part 56 updates the data of the P-Q map 60 to render the hydraulic pump discharge flow rate for the algorithm used to calculate the assumed hydraulic pressure output closer to the actual hydraulic pump discharge flow rate.

Figure 15:
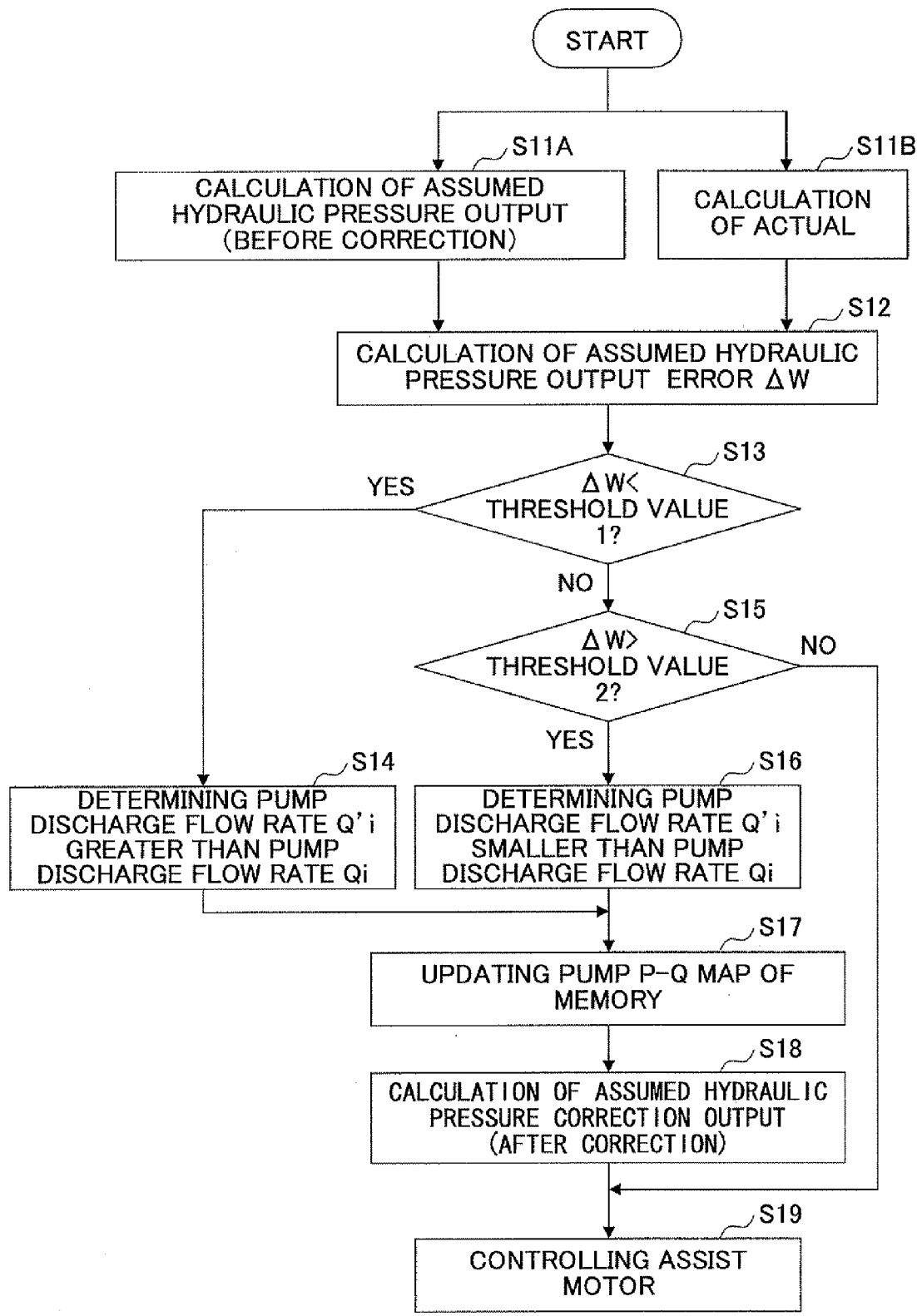
FIG. 15 is a flowchart of a P-Q map automatic adjusting process.

FIG. 15 is a flowchart of a P-Q map automatic adjusting process carried out by the P-Q map control-amount automatic calculation part 56.

When the P-Q map automatic adjusting process is started, the processes of step S11A and step S11B are started. In step S11A, the pump current Ii, the pump discharge pressure Pi and the pump efficiency $\eta$ij obtained from the efficiency map 54 are used to calculate the assumed hydraulic pressure output Win with the algorithm used to calculate the assumed hydraulic pressure output. In step S11B, the actual hydraulic pressure output Wact is calculated by the actual hydraulic pressure output calculating part 58 using the engine output and the assist motor output.

In step S12, the P-Q map control-amount automatic calculation part 56 subtracts the actual hydraulic pressure output Wact calculated in step SUB from the assumed hydraulic pressure output Wi calculated in step S11A to thereby calculate the error $\Delta W$ of the assumed hydraulic pressure output. In step S13, the P-Q map control-amount automatic calculation part 50 determines whether the error $\Delta W$ of the assumed hydraulic pressure output Wi is less than a preset threshold value 1 (negative value).

If it is determined that the error ΔW of the assumed hydraulic pressure output is smaller than the threshold value 1 (negative value), the process goes to step S14. In step S14, the P-Q map control-amount automatic calculation part 56 determines a pump discharge flow rate Q'i greater than a pump discharge flow rate Qi obtained from the P-Q map used in the process of step S11A.

If it is determined that the error ΔW of the assumed hydraulic pressure output is less than the threshold value 1 (negative value), the assumed hydraulic pressure output Win is substantially less than the actual hydraulic pressure output Wact. Therefore, in order to correct the assumed hydraulic pressure output Win to be equal to or close to the actual hydraulic pressure output Wact, the pump discharge flow rate Q of Win=(PiΔQ)/η may be increased to decrease the calculated result of Win. It is preferable to previously set the value of the pump discharge flow rate Q'i greater than the pump discharge flow rate Qi in response to the magnitude of the error ΔW of the assumed hydraulic pressure output.

If it is determined that the error ΔW of the assumed hydraulic pressure output is the threshold value 1 or more in step S13, the process goes to step S15. In step S15, the P-Q map control-amount automatic calculation part 56 determines whether the error ΔW of the assumed hydraulic pressure output is greater than the preset threshold value 2 (positive value).

If it is determined that the error ΔW of the assumed hydraulic pressure output is greater than the threshold value 2 (positive value) in step S15, the process goes to step S16. In step S16, the P-Q map control-amount automatic calculation part 56 determines a pump discharge flow rate Q'i less than the pump discharge flow rate Qi obtained from the P-Q map used in the process of step S11A. If it is determined that the error ΔW of the assumed hydraulic pressure output is greater than the threshold value (positive value), the assumed hydraulic pressure output Win is substantially greater that the actual hydraulic pressure output Wact. Therefore, in order to correct the assumed hydraulic pressure output Win to be equal to or close to the actual hydraulic pressure output Wact, the pump discharge flow rate Q of Win=(Pi×Q)/η may be decreased to decrease the calculated result of Win. It is preferable to previously set the value of the pump discharge flow rate Q'i less than the pump discharge flow rate Qi in response to the magnitude of the error ΔW of the assumed hydraulic pressure output.

If the pump discharge flow rate Q'i greater or less than the pump discharge flow rate Qi is determined in step S14 or step S16, the process goes to step S17. In step S17, the P-Q map control-amount automatic calculation part 56 sends data of the pump discharge flow rate Q'i to the P-Q map 60 to rewrite the pump discharge flow rate Qi of the P-Q map with the pump discharge flow rate Q'i.

Figure 16:
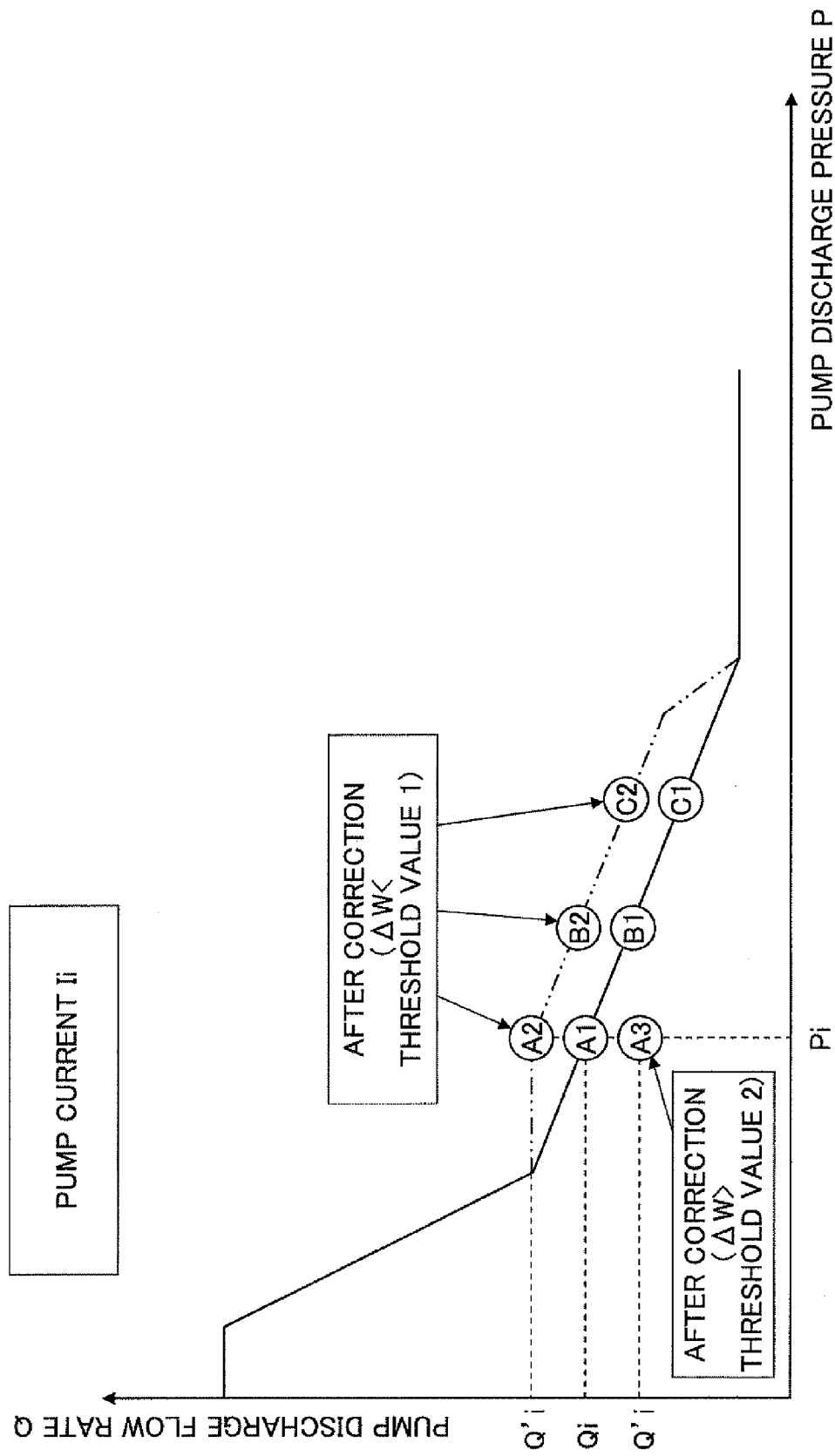
FIG. 16 illustrates rewriting of data of a pump discharge flow rate in the P-Q map.

FIG. 16 illustrates rewriting of data of a pump discharge flow rate in the P-Q map 60. In the P-Q map 60 before rewriting data of the pump discharge flow rate, data of a value along a P-Q line indicated by a solid line in FIG. 16 are stored. If the pump discharge pressure Pi is given, the pump discharge flow rate Qi at a point A1 of the P-Q line indicated by the solid line is output from the P-Q map 60.

If the error ΔW of the assumed hydraulic pressure output is smaller than the threshold value 1 (negative value), the pump discharge flow rate Q'i greater than the pump discharge flow rate Qi is determined by the process of step S14. The pump discharge flow rate Q'i is rewritten by the pump discharge flow rate Qi corresponding to the pump discharge pressure Pi in the P-Q map 60. Then, the point A1 moves to the point A2 and the P-Q line is changed along a two-dot chain line.

If the error ΔW of the assumed hydraulic pressure output is greater than the threshold value 2 (positive value), the pump discharge flow rate Q'i less than the pump discharge flow rate Qi is determined by the process of step S16. The pump discharge flow rate Q'i is rewritten by the pump discharge flow rate Qi corresponding to the pump discharge pressure Pi in the P-Q map 60. Then, the point A1 moves to the point A3 and an effect is caused as if the P-Q line is changed. Therefore, if a pump discharge pressure Pi is input into the P-Q map before the P-Q map automatic adjusting process is carried out, the pump discharge flow rate Qi corresponding to the pump discharge pressure Pi is output. However, after the P-Q map automatic adjusting process is carried out, the pump discharge flow rate Q'i is output upon the input of the pump discharge pressure Pi in the P-Q map.

It is preferable to carry out the P-Q map automatic adjusting process at points B1 and C1 in FIG. 16 by changing the pump discharge pressure Pi. FIG. 16 illustrates the data of the map 60 is updated so that the point B1 moves to the point B2 and the point C1 moves to the point C2.

The P-Q map adjusted with the above algorithm used to calculate the assumed hydraulic pressure output corresponds to a hydraulic pump characteristic parameter.

The process up to step S17 corresponds to the P-Q map automatic adjusting process. If the P-Q map stored in the memory is updated in step S17, the process goes to step S18. In step S18, the pump current Ii, the pump discharge pressure Pi and the pump discharge flow rate Q' obtained from the rewritten P-Q map 60 are used to calculate the assumed hydraulic pressure output Win with the algorithm used to calculate the assumed hydraulic pressure output. The assumed hydraulic pressure output Win calculated in step S18 is calculated based on the rewritten pump discharge flow rate Q' and has a value close to the actual pump output.

Thereafter, in step S19, the assumed hydraulic pressure output Win calculated in step S18 is used to control the operation of the assist motor 34. Since the assumed hydraulic pressure output Win is close to the actual pump output, it is possible to appropriately control the operation of the assist motor 34 to maintain the load of the engine 30 in an appropriate condition.

If it is determined that the error ΔW of the assumed hydraulic pressure output is the threshold value 2 (positive value) or less, the P-Q map is not updated and the process goes to step S19. Therefore, the assumed hydraulic pressure output Win calculated in step S11A is used in the process of step S19.

Although in the above description, the hydraulic pump 21 is controlled based on the negative control, the hydraulic pump 21 may be controlled with the positive control or the load sensing control in a similar manner to Embodiment 1.

Figure 17:
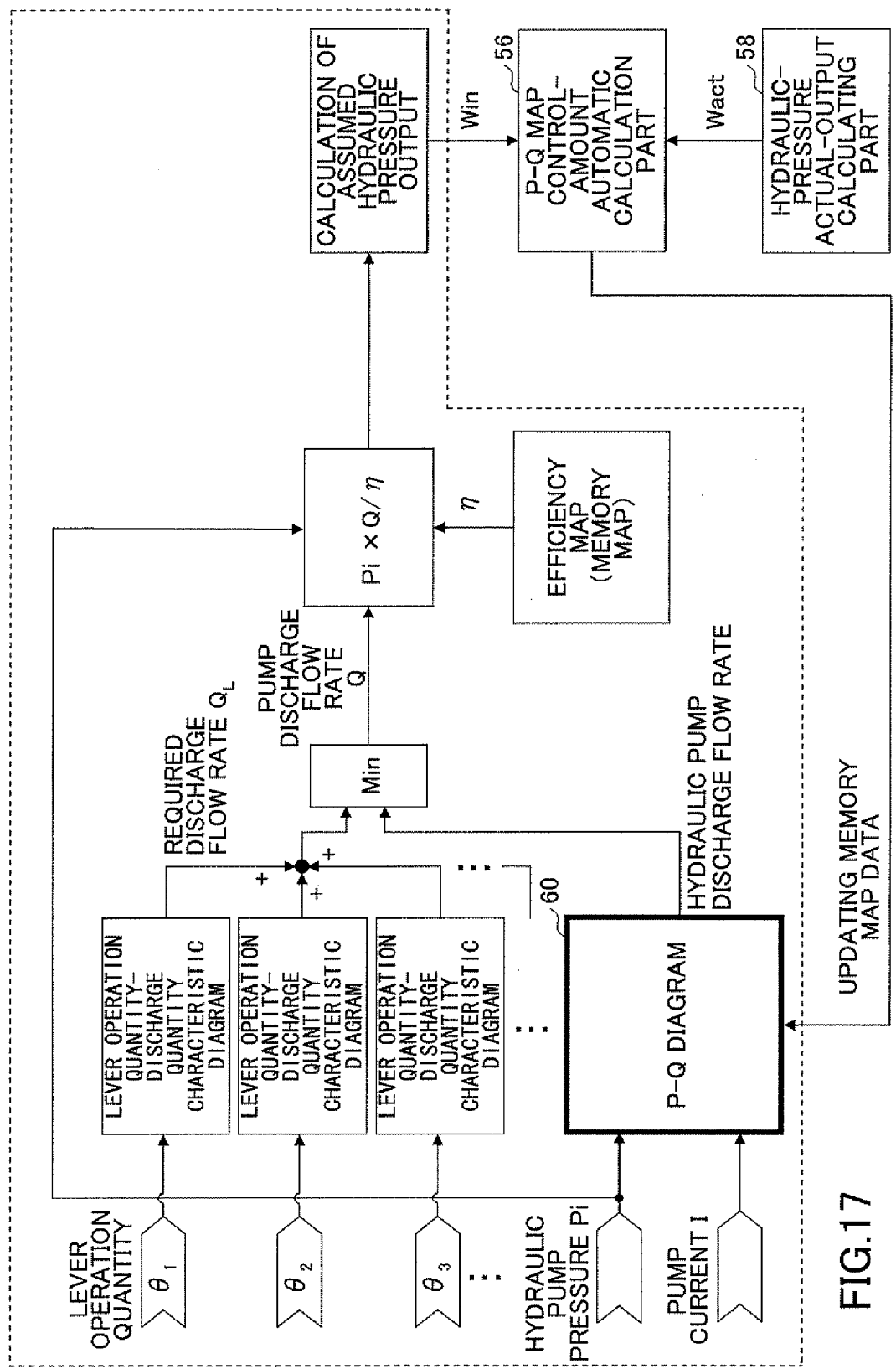
FIG. 17 illustrates a calculation algorithm of a hydraulic pressure load used in calculating the assumed hydraulic pressure output in a case where a positive control is carried out.

The positive control for driving the hydraulic pump 21 is described. FIG. 17 illustrates a hydraulic load estimating algorithm used in calculating the assumed hydraulic pressure output Win in a case where the control circuit of the pump is formed to carry out the positive control. In the case where the positive control is carried out, the process for obtaining the pump discharge flow rate Q is different in the hydraulic load estimating algorithm for the negative control illustrated in FIG. 14 and the other process is the same. Therefore, the process for obtaining the pump discharge flow rate Q is described.

When the positive control is carried out, discharge quantities $V_{L1}, V_{L2} \ldots$ required in the hydraulic pump 21 corresponding to lever operation amounts $\theta_1, \theta_2 \ldots$ of an operation lever operated by a driver to drive a hydraulic drive portion are obtained from a map indicating a relationship between the lever operation amounts $\theta_1, \theta_2 \ldots$ and the discharge quantities $V_{L1}$, $V_{L2}$ .... The sum of the discharge quantities $V_{L1}$, $V_{L2}$ ... becomes a required discharge flow rate $Q_L$, required for the hydraulic pump 21.

The pump discharge flow rate Q becomes the smaller one of the hydraulic pump discharge flow rate and the discharge flow rate $Q_L$. By using the acquired pump discharge flow rate Q for the assumed hydraulic pressure output Win, it is possible to accurately calculate the assumed hydraulic pressure output Win using the algorithm illustrated in FIG. 17.

Figure 18:
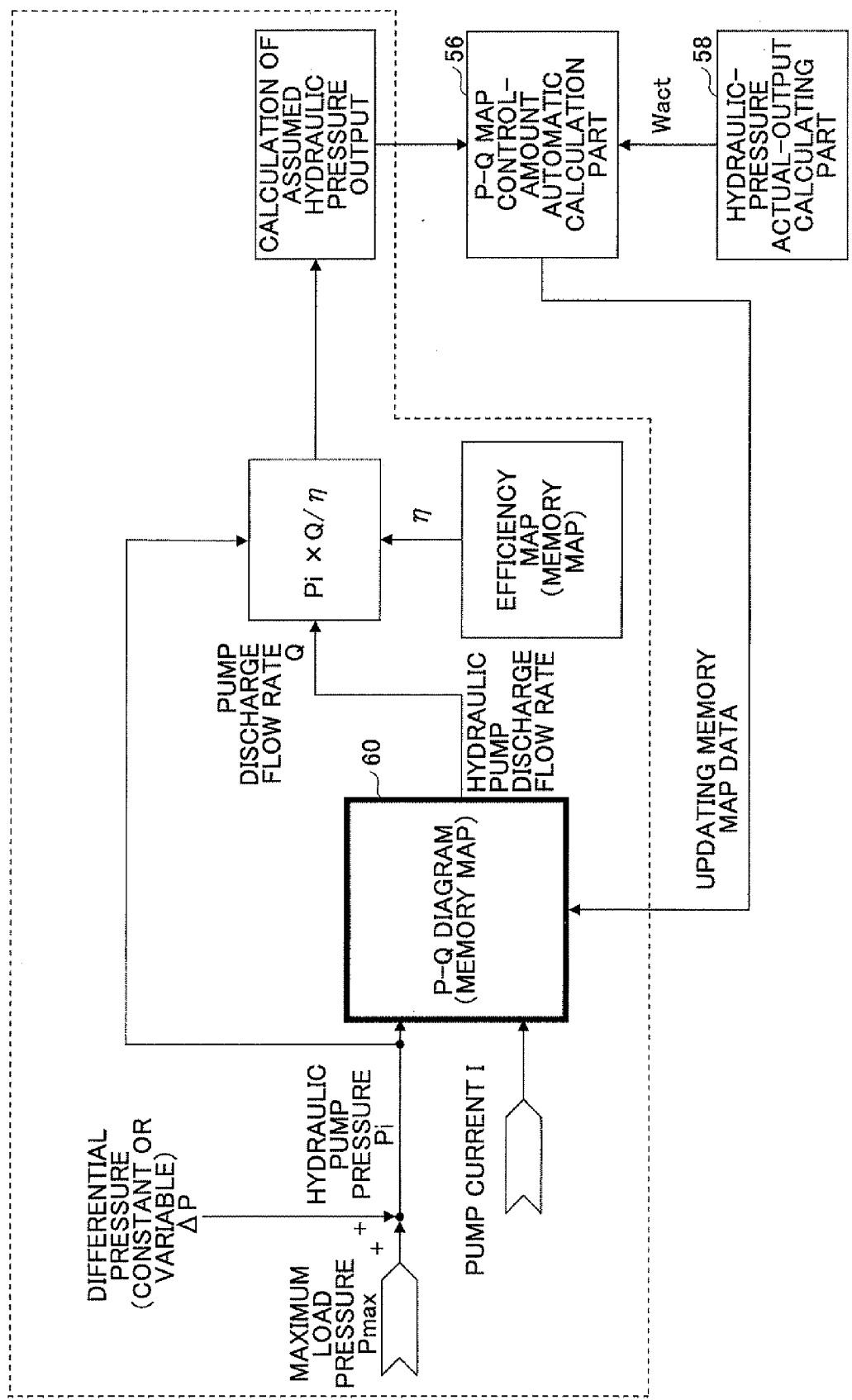
FIG. 18 illustrates a calculation algorithm of a hydraulic load used in calculating the assumed hydraulic pressure output in a case where a load sensing control is carried out.

The load sensing control for driving the hydraulic pump 21 is described next. FIG. 18 illustrates a hydraulic load calculation algorithm used in calculating the assumed hydraulic pressure output Win in a case where the control circuit of the pump is formed to carry out the load sensing control. In the case where the load sensing control is carried out, the process for obtaining the pump discharge flow rate Q is different from the hydraulic load estimating algorithm illustrated in FIG. 14 and the other process is the same. Therefore, the process for obtaining the pump discharge flow rate Q is described.

In the load sensing control, the hydraulic pump discharge pressure Pi illustrated in FIG. 14 is determined by adding the differential pressure ΔP to the maximum load pressure Pmax. The differential pressure ΔP is added to give a certain margin to the pump discharge flow rate. The differential pressure ΔP may be a constant value or variable value. The pump discharge flow rate Q may be determined from the hydraulic discharge pressure Pi and the pump current (control current) I supplied to the hydraulic pump 21 based on the P-Q diagram illustrating the pump discharge pressure-pump discharge quantity characteristic of the hydraulic pump 21. By using the acquired pump discharge flow rate Q for the assumed hydraulic pressure output Win, it is possible to accurately calculate the assumed hydraulic pressure output Win using the algorithm illustrated in FIG. 18.

In Embodiment 2, the block chart using both the negative control pressure (nega-con pressure) Nc and the hydraulic discharge pressure Pi is illustrated for the explanation. However, it is unnecessary to always use the negative control pressure (nega-con pressure) Nc, and the pump discharge flow rate Q may be calculated from the hydraulic discharge pressure Pi.

The load on the engine 30 can be constantly appropriate by calculating the assumed hydraulic pressure output Win, being the hydraulic pump output on the shaft input side, with the algorithm used to calculate the assumed hydraulic pressure output illustrated in FIG. 7, FIG. 11, FIG. 13, FIG. 14, FIG. 17 and FIG. 18 and controlling the assist amount of the assist motor 34. Therefore, an overload on the engine 30 is prevented and the hybrid working machine can be constantly operated in an efficient condition.

Said differently, the output of the assist motor 34 (having positive value under an electromotive state) is controlled to have a value as much as a difference between the output of the variable displacement hydraulic pump 21 in the shaft input side and the output We of the engine 30; i.e., Wa=Win−We. If the output Win of the hydraulic pump 21 becomes greater than the sum of the output We of the engine 30 and the output Wa of the assist motor 34, i.e., Win>We+Wa, an excessive load is applied to the engine 30. Thus, the maximum output Wamax of the assist motor 34 is controlled to be greater than a difference between the output Win of the variable displacement hydraulic pump 21 and the maximum output Wemax of the engine like Wamax>Win−Wemax. If there is a request of outputting to an electrical load by an output Wout, the maximum output Wamax of the assist motor 34 in the electromotive state is limited to be in a range smaller than the difference between the maximum output Wbmax of the battery 38 and the requested output Wout to the electrical load like Wamax<Wbmax−Wout.

Referring to Embodiments 1 and 2, an example of a power distributing process for distributing power from the engine and the battery is described based on the hydraulic load acquired based on the hydraulic load calculation algorithms. The hydraulic pump output on the shaft input side is acquired with estimating calculation using the hydraulic load calculation algorithms illustrated in FIG. 4 and FIG. 7. The hydraulic pump output on the shaft input side is accurately calculated to control the assist amount of the assist motor 34. Thus, the load on the engine can be appropriately controlled. Therefore, an overload on the engine 30 is prevented and the hybrid working machine can be constantly operated in an efficient condition. The power distribution is carried out by the controller 42.

Figure 19:
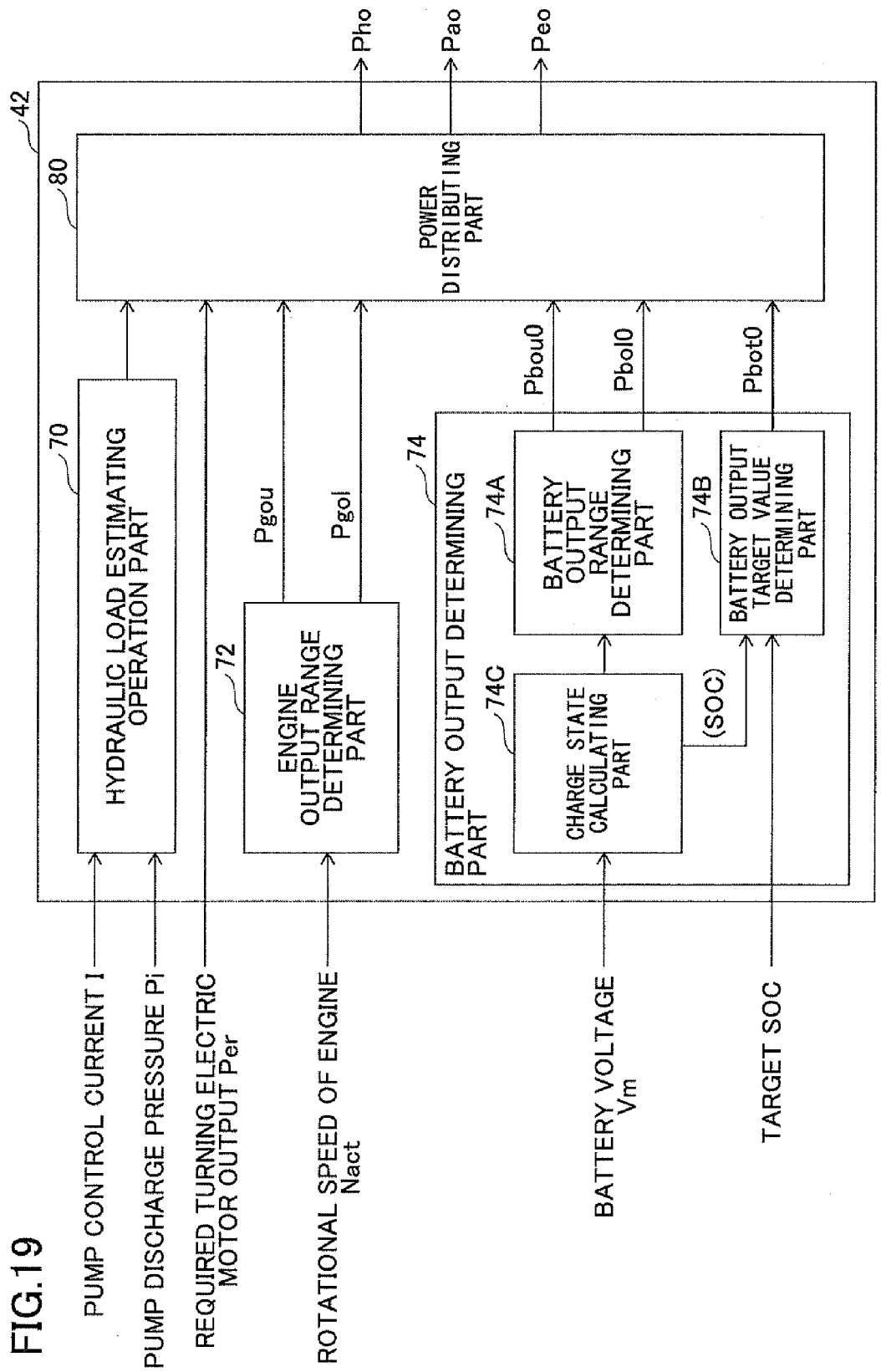
FIG. 19 is a control block chart illustrating an example of a power distributing process carried out by the controller.

FIG. 19 is a control block chart illustrating an example of a power distributing process carried out by the controller 42. A pump control current I, a pump discharge pressure Pi, a required output of turning electric motor Per, a rotational speed of engine Nact and a battery voltage Vm are input into the controller 42.

The required output of turning electric motor Per corresponds to electric power required by an electrical load. For example, the required output of turning electric motor Per is calculated based on an operation amount of an operation lever operated by an operator. The rotational speed of engine Nact corresponds to the actual rotational speed of the engine 30. The engine 30 is constantly driven when a hydraulic shovel is operated and the rotational speed Nact of the engine 30 is detected. The battery voltage Vm corresponds to an inter-terminal voltage of the battery 38 and detected by a voltmeter. The pump control current I and the pump discharge pressure Pi are input into a hydraulic load estimating operation part 70. The hydraulic load estimating operation part 70 calculates the hydraulic pump output Win as a hydraulic load with the above-described hydraulic load calculation algorithm and using the pump control current I and the pump discharge pressure Pi. The calculated hydraulic pump output Win is supplied to the power distributing part 80.

The rotational speed of engine Nact is input into the engine output range determining part 72. The engine output range determining part 72 stores a map or a conversion table for acquiring an engine output upper limit value and an engine output lower limit value from the rotational speed of engine Nact. The engine output range determining part 72 calculates an engine output upper limit value Pgou and an engine output lower limit value Pgol based on the rotational speed of engine Nact and supplies the calculated value to the power distributing part 80.

The battery voltage Vm and a target SOC are input into a battery output determining part 74. The battery output determining part 74 includes a battery output range determining part 74A, a battery output target value determining part 74B and a charge state calculating part 74C. The charge state calculating part 74C calculates the charge state (SOC) from the input battery voltage Vm. The calculated SOC is given to the battery output range determining part 74A and the battery output target value determining part 74B.

The battery output range determining part 74A stores a map or a conversion table for calculating the battery upper limit value and the battery lower limit value from the charge state (SOC). The battery output target value determining part 74B stores a map or a conversion table for calculating the battery output target value from the SOC and the target SOC. This map or the conversion table may define a relationship between a deviation of the input SOC from the target SOC and a battery output target value. The target SOC may be determined in an arbitrary mode and ordinarily a fixed value or a variable value, except for an occasion in which the target SOC pattern is generated as a pattern for measuring an internal resistance described later. The battery output range determining part 74A acquires a first battery output upper limit value Pbou0 and a first battery output lower limit value Pbol0 from the SOC and supplies the acquired values to the power distributing part 80. The battery output target value determining part 74B calculates a first battery output target value Pbot0 from the input SOC and the target SOC and supplies those to the power distributing part 80.

The first battery output upper limit value Pbou0 corresponds to the upper limit value of discharge power. The first battery output lower limit value Pbol0 is negative and the absolute value of the first battery output lower limit value Pbol0 corresponds to the upper limit value of a charge power. An appropriate range of the input and output voltage of the battery 38 is defined by a second battery output upper limit value Pbou1 and a second battery output lower limit value Pbol1. For example, if the degradation of the battery 38 is not detected based on a result of measuring the internal resistance of the battery 38, Pbou1=Pbou0 and Pbol1=Pbol0 are established. If the degradation of the battery 38 is detected based on the result of measuring the internal resistance of the battery 38, Pbou1<Pbou0 and Pbol1>Pbol0 are established.

The power distributing part 80 finally determines a hydraulic load output Pho, a motor generator output Pao for the assist motor 34 and an electrical load output Peo based on the required hydraulic load output Phr, the engine output upper limit value Pgou, the engine output lower limit value Pgol, the first battery output upper limit value Pbou0, the first battery output lower limit value Pbol0 and the first battery output target value Pbot0. At this time, the power distributing part 80 finally determines and outputs the hydraulic load output Pho, the motor generator output Pao and the electrical load output Peo for the assist motor 34 so that the engine output resides in the range defined by the engine output upper limit value Pgou and the engine output lower limit value Pgol, and the battery output resides in the range defined by the first battery output upper limit value Pbou0 and the first battery output lower limit value Pbol0.

The controller 42 controls the assist motor 34 based on the determined output.

As described, the hydraulic pump output on the shaft input side Win is accurately calculated using the hydraulic load estimating algorithm to control the assist amount of the assist motor 34. Thus, the load on the engine 30 can be appropriately controlled. Therefore, an overload on the engine 30 is prevented and the hybrid working machine can be constantly operated in an efficient condition.

Further, if the positive control is carried out, the lever operation amount θi is input into the controller 42 instead of the pump discharge pressure Pi. If the load sensing control is carried out, the maximum load pressure Pmax and the differential pressure ΔP are input into the controller 42 instead of the pump discharge pressure Pi.

However, especially if the hydraulic load is calculated, it is necessary to accurately calculate the hydraulic pump discharge flow rate of the hydraulic pump driven by the outputs of the engine 30 and the assist motor 34. The hydraulic pump discharge flow rate is acquired with the pump discharge pressure-pump discharge quantity characteristic diagram (P-Q diagram) or the negative control map and using the hydraulic discharge pressure, the hydraulic pump control current or the negative control pressure. The P-Q diagram and the negative control map represent static characteristics. Therefore, a large error may occur in a transient property.

Specifically, if the actual hydraulic pump discharge pressure suddenly increases from P1 to P2, the hydraulic pump discharge flow rate Q obtained from the P-Q diagram may be linearly and suddenly decreased from Q1 to Q2 within a short time. Thus, an error between the hydraulic pump discharge flow rate Q obtained from the P-Q diagram and the actual flow rate changing characteristics becomes great. The hydraulic pump output is acquired as a product of the pump discharge pressure and the pump discharge flow rate. Therefore, if there is an error in the change of the pump discharge flow rate relative to the pump discharge pressure, the hydraulic pump output may also contain the error. Then, it is impossible to accurately calculate the hydraulic load.

The errors of the pump discharge flow rate in the above transient property may exist in acquiring not only the hydraulic discharge pressure of the hydraulic pump but also a pump discharge flow rate from a pump control current and a negative control pressure. Therefore, the pump discharge quantity acquired from the pump control current and the negative control pressure may contain the error. Therefore, there is a problem of accurately calculating the hydraulic load by the error generated in calculating the hydraulic load. Therefore there may be a problem of accurately calculating the hydraulic load by the error generated in calculating the pump discharge flow rate.

As described, after calculating the pump discharge flow rate by using the actually measured value of the hydraulic discharge pressure, the control current, and the negative control pressure, the error in calculating the pump discharge flow rate of the transient property becomes large.

In consideration of the above problem, Embodiment 3 of the present invention is provided to calculate the discharge flow rate of the hydraulic pump in consideration of the hydraulic discharge pressure, the pump control current, and the negative control pressure to thereby accurately calculate the hydraulic load.

Next, the modified example 3 of the present invention is described.

According to Embodiment 3 of the present invention, the discharge flow rate of the hydraulic pump is calculated in consideration of the properties of the hydraulic pump in a transient property such as a pump discharge pressure, a control current and a negative control pressure of the hydraulic pump. Therefore, it is possible to appropriately control assisting of the electric motor based on the hydraulic load which has been accurately calculated to thereby appropriately control assisting with the electric motor.

Figure 20:
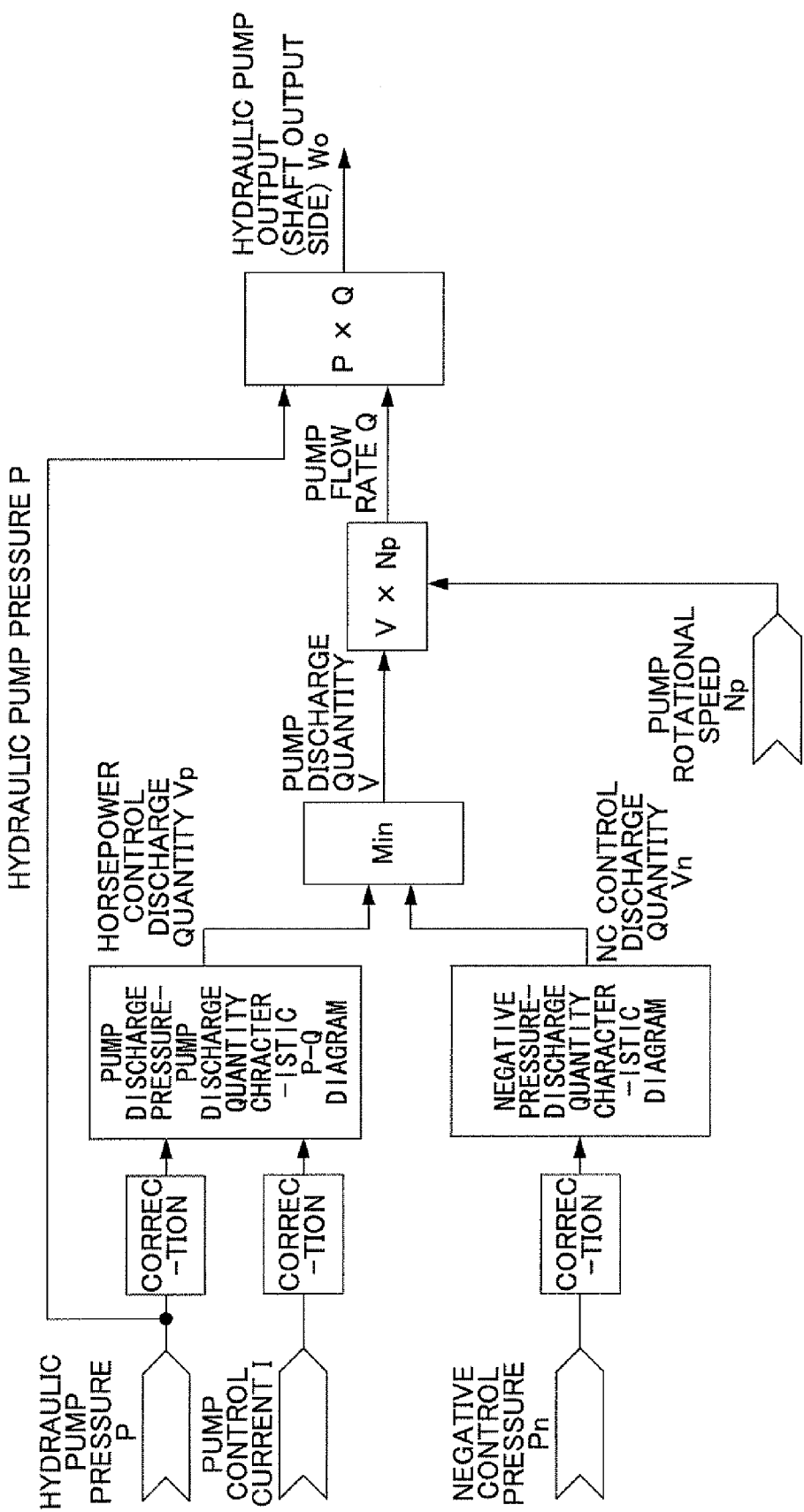
FIG. 20 is a diagram illustrating a hydraulic load calculation algorithm of Embodiment 3.

Referring to FIG. 20, the algorithm used by the controller 42 to calculate the hydraulic load of Embodiment 3 is described.

The hydraulic load corresponds to the hydraulic pump output on the shaft input side Wo and is calculated as the product of the discharge pressure P and the discharge flow rate Q as Wo=P×Q. A value actually measured with the hydraulic sensor is used as the discharge pressure P. The discharge flow rate Q is calculated by multiplying a pump discharge quantity V by a pump rotational speed (rpm) Np.

The pump discharge quantity V becomes the smaller one of the horsepower control discharge quantity Vp and the negacon discharge quantity Vn.

The horsepower control discharge quantity Vp may be determined from the discharge pressure Pi and a control current I supplied to the hydraulic pump 21 based on a P-Q diagram illustrating a pump discharge pressure-pump discharge quantity characteristic of the hydraulic pump 21. FIG.

Figure 21:
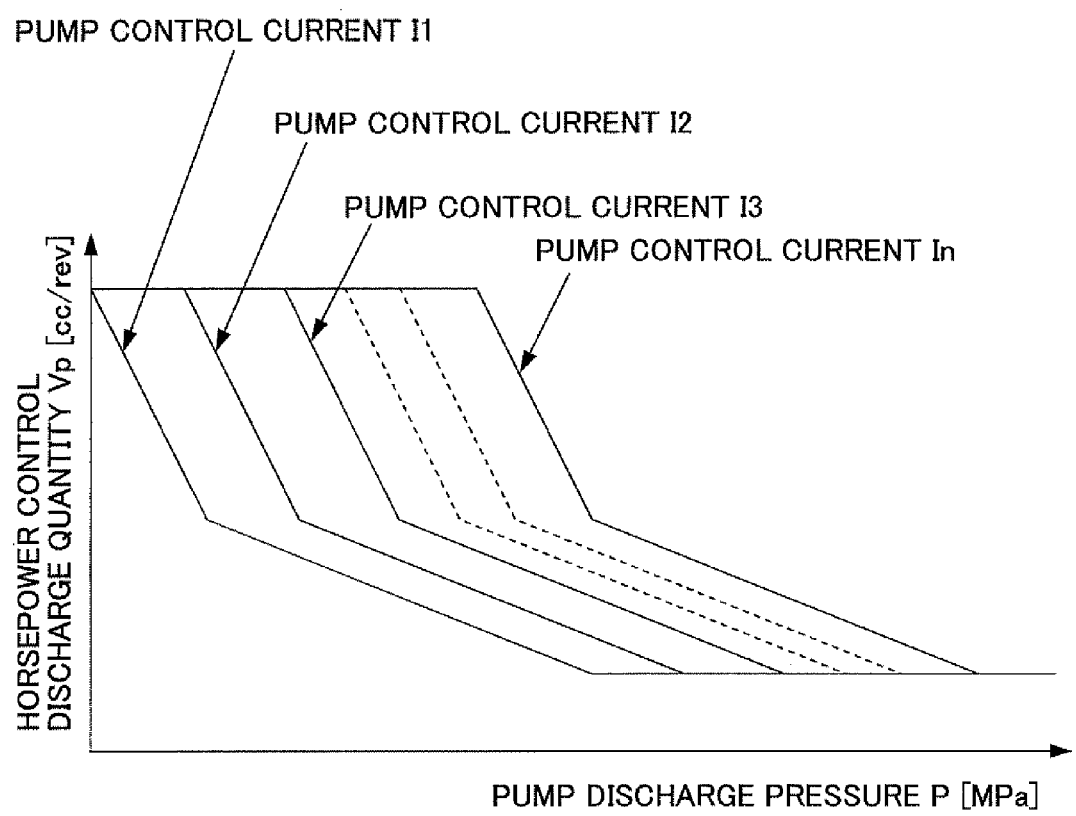
FIG. 21 is a P-Q diagram illustrating the relationship between the discharge pressure and discharge flow rate of a hydraulic pump.

21 is the P-Q diagram illustrating the pump discharge pressure-pump discharge quantity characteristic of the hydraulic pump 21. In the P-Q diagram illustrated in FIG. 21, the axis of abscissa represents the discharge pressure P and the axis of ordinate represents the horsepower control discharge quantity Vp. The discharge pressure P of the hydraulic pump 21 is inversely proportional to the horsepower control discharge quantity Vp, and the P-Q diagram is changed by the pump limit current I. In this P-Q diagram, if the pump limit current I and the discharge pressure P are determined, the horsepower control discharge quantity Vp is obtainable.

Figure 22:
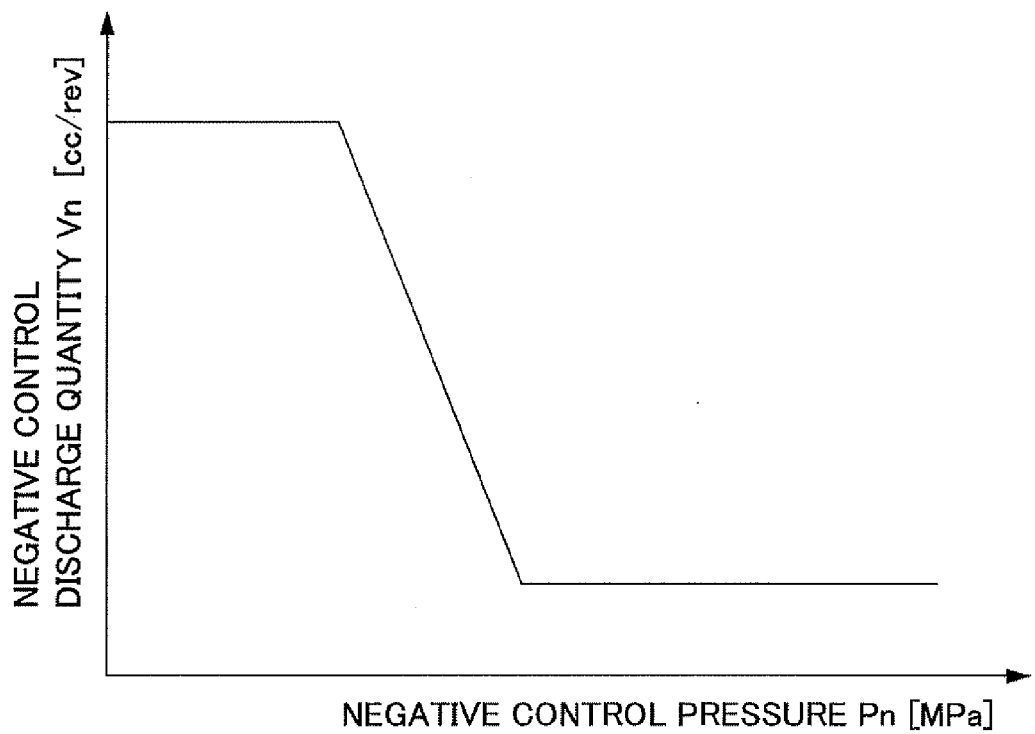
FIG. 22 is a graph illustrating a relationship between a negative control pressure and a discharge quantity.

The nega-con discharge quantity Vn is obtained by referring to a corresponding negative control pressure Pn in the negative control pressure-discharge quantity characteristic diagram. FIG. 22 is a negative control pressure-discharge quantity characteristic diagram. In the graph illustrated in FIG. 22, the axis of abscissa represents the negative control pressure Pn, and the axis of ordinate designates the nega-con discharge quantity Vn. Referring to FIG. 6, if the negative control pressure Pn is determined, it is possible to acquire the nega-con discharge quantity Vn.

If the smaller one of the horsepower control discharge quantity Vp of the hydraulic pump 21 and the nega-con discharge quantity Vn is acquired as the discharge quantity V, the rotational speed Np of the hydraulic pump 21 is multiplied by the acquired discharge quantity V to thereby acquire the discharge flow rate Q of the hydraulic pump 21 like Q=V×Np. It is possible to acquire the hydraulic pump load No by multiplying the discharge pressure P of the hydraulic pump 21 by the discharge flow rate Q as Wo=P×Q.

Figure 23:
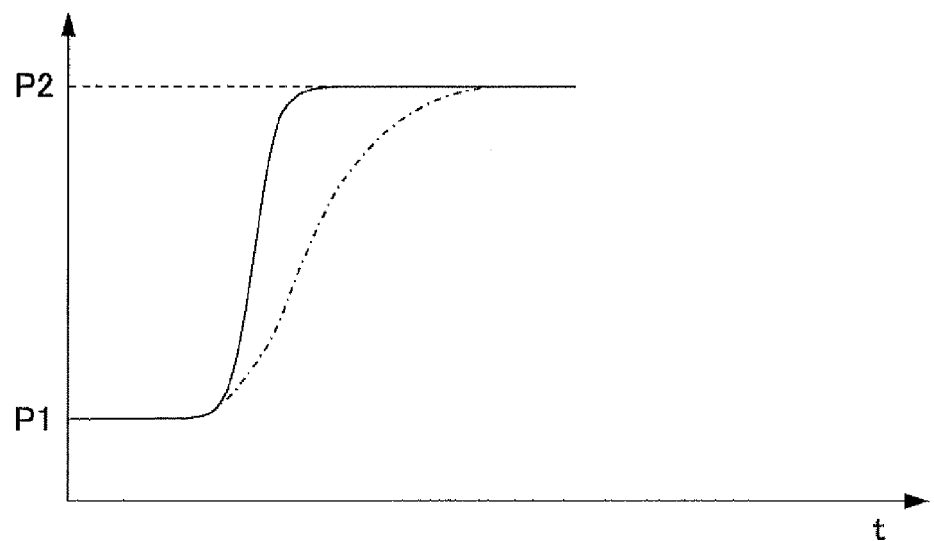
FIG. 23 is a graph illustrating a change characteristic in increasing a pump discharge pressure.
Figure 24:
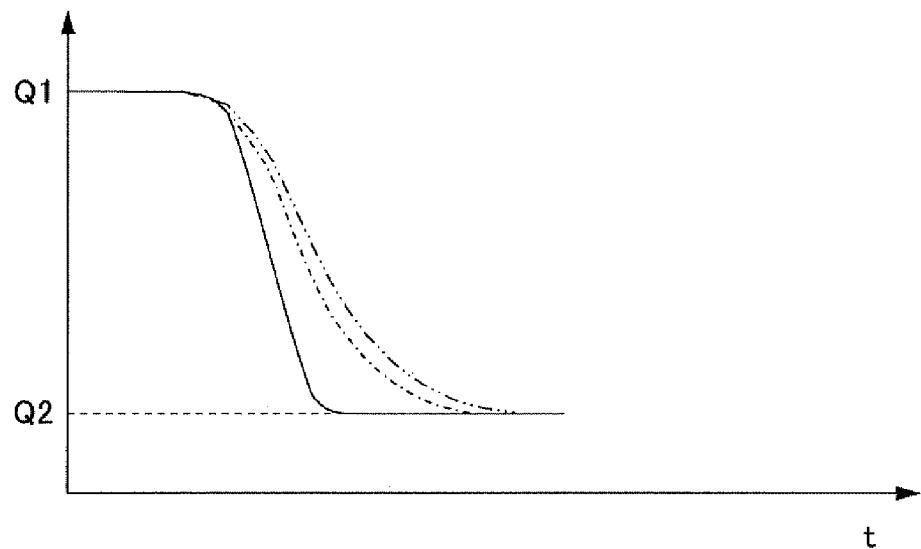
FIG. 24 is a graph illustrating a change of a discharge flow rate corresponding to a pressure change illustrated in FIG. 23.

In the hydraulic load calculation algorithm illustrated in FIG. 20 of acquiring a horsepower control discharge quantity Vp from the P-Q diagram in the hydraulic load calculation algorithm illustrated in FIG. 20, the hydraulic pump discharge pressure P and the pump control current I are used. Because there is a time lag between the increment of the discharge pressure P of the pump discharge pressure sensor 23, the pump discharge pressure sensor 23 being more than a predetermined value and an actual decrement of the discharge flow rate Q of the hydraulic pump 21, a transient property affects the discharge flow rate Q corresponding to the hydraulic pump discharge pressure. If the discharge pressure P of the hydraulic pump 21 increases from P1 to P2 along the solid line in FIG. 23, the pump discharge quantity calculated from the P-Q diagram suddenly changes from Q1 to Q2 as illustrated in FIG. 24. Then, an error from the discharge flow rate changing characteristic indicated by a two-dot chain line in FIG. 24 and being inherent as the actual value of the hydraulic pump becomes large. The discharge flow rate changing characteristic may be acquired by a bench check.

Then, the hydraulic pump discharge pressure P is not used and the discharge pressure P as the hydraulic pump characteristic parameter is corrected by using a time constant Tpa so as to conform to the transient property of the pump discharge flow rate (inherent discharge flow rate changing characteristic). As a result, an error between the hydraulic pump discharge flow rate indicated by a one-dot chain line in FIG. 24) which is acquired from the corrected pump discharge pressure P indicated by a one-dot chain line in FIG. 23 and an inherent discharge quantity changing characteristic indicated by the two-dot chain line in FIG. 24 becomes small. Then, the hydraulic load is calculated based on the acquired flow rate changing characteristics to thereby accurately calculate the hydraulic load. With this feature, the motor generator 34 can be accurately controlled and the hybrid working machine can be continuously operated.

In a similar manner to the discharge pressure P, it is necessary to consider the inherent discharge flow rate changing characteristic for the pump control current I. If the pump control current I of the hydraulic pump 21 increases from I1 to I2 along the solid line in FIG. 25, the pump discharge quantity calculated from the P-Q diagram in FIG. 26 suddenly increases from Q1 to Q2. Then, an error from the inherent discharge flow rate changing characteristic indicated by a two-dot chain line in FIG. 26 and being inherent as the actual value of the hydraulic pump becomes large.

Then, the pump control current I as the hydraulic pump characteristic parameter is corrected by using a time constant Tia so that the pump control current I matches a transient property of the pump discharge flow rate without directly using the pump control current. As a result, an error between the hydraulic pump discharge flow rate indicated by a dot chain line in FIG. 26) which is acquired from the corrected pump control current I indicated by the two-dot chain line in FIG. 25 and an inherent discharge quantity changing characteristic indicated by the two-dot chain line in FIG. 24 becomes small. Then, the hydraulic load is calculated based on the acquired discharge flow rate changing characteristic to thereby accurately calculate the hydraulic load.

Figure 27:
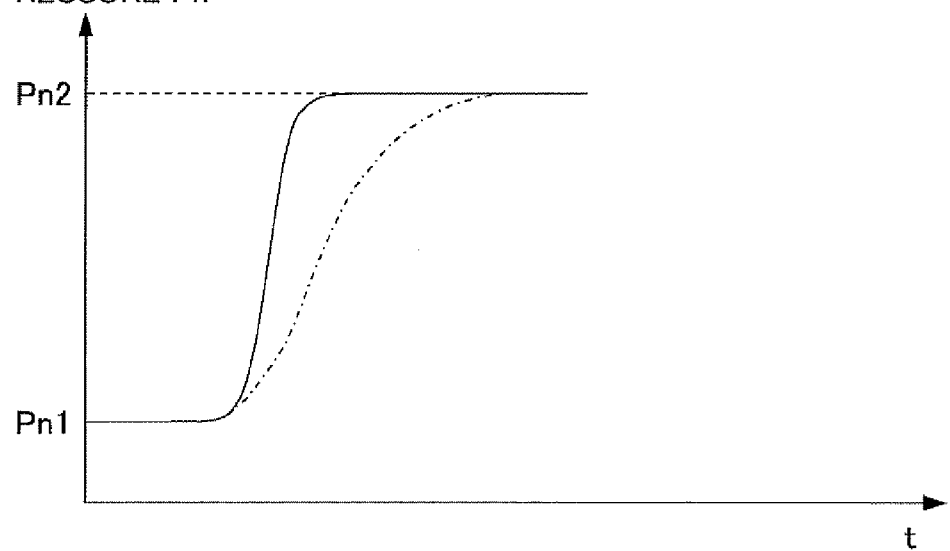
FIG. 27 is a graph illustrating a change characteristic in increasing the negative control pressure.
Figure 28:
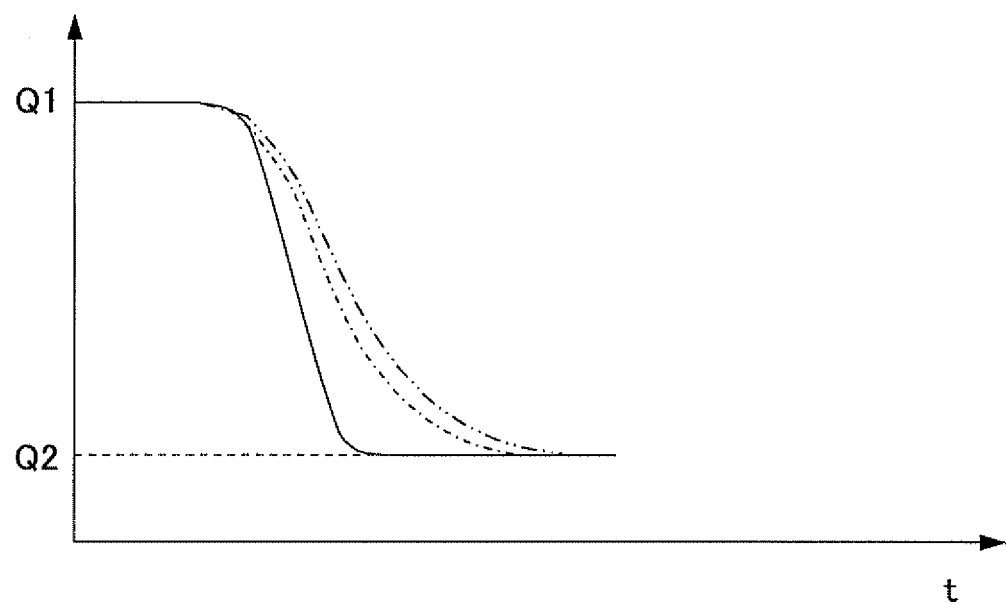
FIG. 28 is a graph illustrating a change of the pump discharge flow rate corresponding to the pressure change illustrated in FIG. 27.
Figure 29:
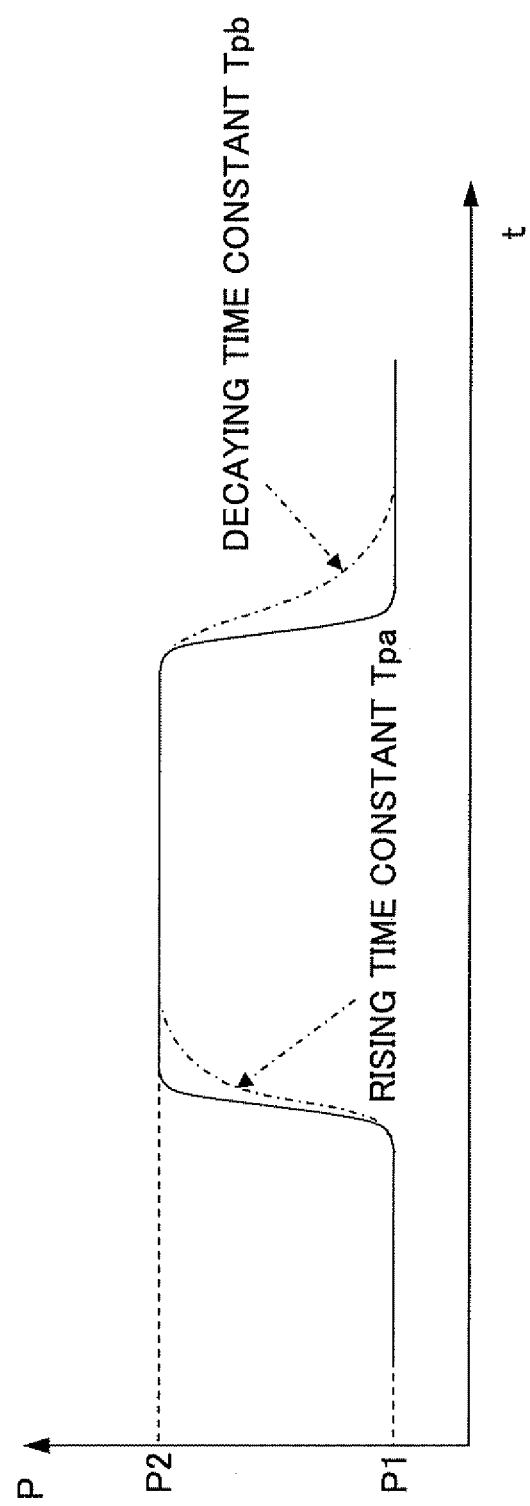
FIG. 29 is a graph illustrating a change characteristic of the pump discharge pressure.

Further, it is necessary to consider the discharge flow rate changing characteristic for a change of the negative control pressure Pn. If the negative control pressure Pn increases from Pn1 to Pn2 along the solid line in FIG. 27, the pump discharge quantity calculated from the P-Q diagram suddenly decreases from Q1 to Q2 as illustrated in FIG. 28. Then, an error from the discharge flow rate changing characteristic indicated by a two-dot chain line in FIG. 28 and being inherent as the actual value of the hydraulic pump becomes large.

Then, the negative control pressure Pn as the hydraulic pump characteristic parameter is corrected by using a time constant Tna so that the negative control pressure Pn matches a transient property of the pump discharge flow rate without directly using the negative control pressure Pn. As a result, an error between the hydraulic pump discharge flow rate indicated by the dot chain line in FIG. 28 which is acquired from the corrected negative control pressure Pn indicated by the two-dot chain line in FIG. 27 and the inherent discharge quantity changing characteristic indicated by the two-dot chain line in FIG. 28 becomes small. Then, the hydraulic load is calculated based on the acquired discharge flow rate changing characteristic to thereby accurately calculate the hydraulic load.

With Embodiment 3, the control signals used in the load calculation algorithm illustrated in FIG. 20 such as values of the hydraulic pump discharge pressure P, the pump control current I and the negative control pressure Pn are corrected based on the inherent discharge flow rate changing characteristic. The horsepower control discharge quantity Vp and the discharge quantity Vn are acquired using the corrected value.

Said differently, values of the hydraulic pump discharge pressure P input into the hydraulic pump 21 and the pump control current I are corrected based on the discharge flow rate changing characteristic inherent in the hydraulic pump 21 as the control signal for controlling driving of the hydraulic pump 21, and the horsepower control discharge quantity Vp is accurately acquired using the corrected value. Further, the value of the negative control pressure Pn is corrected based on the discharge flow rate changing characteristic inherent in the negative control system to thereby acquire an NC discharge quantity Vn using the corrected value.

The correction of the hydraulic pump discharge pressure P as one of the control signals for controlling driving of the hydraulic pump 21 is described further in detail. FIG. 23 is a graph for illustrating a change characteristic in increasing the pump discharge pressure P from P1 to P2. Referring to FIG. 23, an actual pressure change is illustrated with a solid line and a pressure change in a case of correcting the discharge pressure in consideration of the discharge flow rate changing characteristic inherent in the hydraulic pump 21 is indicated by a one-dot chain line. The pressure change corrected in consideration of the discharge flow rate changing characteristic inherent in the hydraulic pump 21 changes without following the actual pressure change and with a time lag.

FIG. 24 illustrates a change of the pump discharge flow rate Q calculated based on the pressure change illustrated in FIG. 23. If the discharge pressure is increased from P1 to P2, the discharge flow rate is decreased from Q1 to Q2. Referring to FIG. 24, the solid line indicates a change of the discharge flow rate calculated without correction based on the actual pressure change indicated by the solid line of FIG. 23. However, if there is the actual pressure change indicated by the solid line of FIG. 23, the actual discharge flow rate cannot follow the pressure change, and the actual discharge flow rate changes in accordance with the discharge flow rate changing characteristic inherent in the hydraulic pump 21 as indicated by the two-dot chain line of FIG. 24.

If the pressure change is corrected in consideration of the discharge flow rate as indicated by the one-dot chain line of FIG. 23 in consideration of the discharge flow rate changing characteristic and the discharge flow rate is calculated based on the corrected pressure change, it is possible to calculate the discharge flow rate change as indicated by the one-dot chain line of FIG. 24 approximate to the actual discharge flow rate indicated by the two-dot chain line of FIG. 24.

As described, by calculating the discharge flow rate of the hydraulic pump 21 with the discharge pressure P corrected in consideration of the inherent discharge flow rate changing characteristic, it is possible to calculate the discharge flow rate substantially equal to the actual discharge flow rate. Thus, the output of the hydraulic pump 21 can be more accurately calculated. With this, it is possible to accurately acquire an input to the hydraulic pump 21 and the assist amount for the motor generator 34 can be appropriately set. As a result, the load on the engine 30 can be appropriately controlled to thereby prevent degradation of fuel consumption and engine stall of the engine 30 from occurring.

Figure 25:
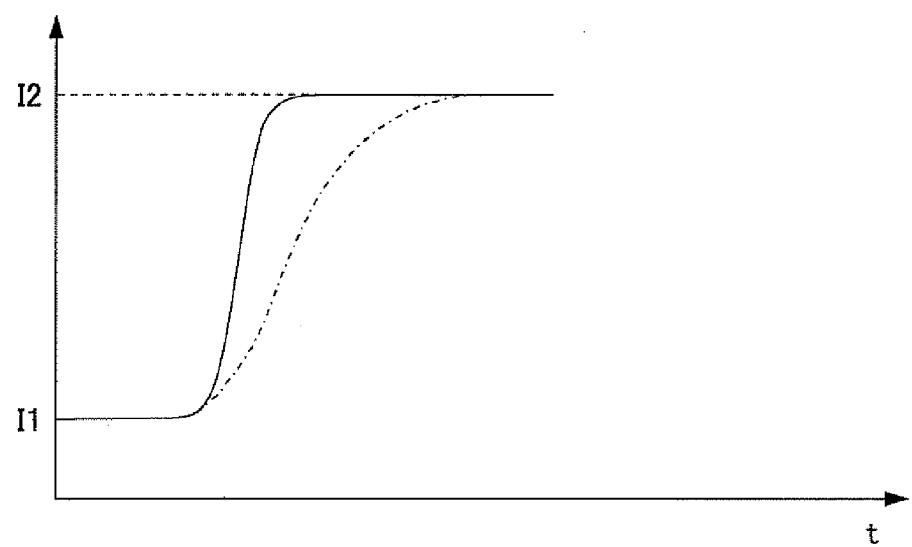
FIG. 25 is a graph illustrating a change characteristic in increasing a pump control current.

With the above description, the case where the discharge pressure P is corrected using the time constant Tpa in increasing the discharge pressure P from P1 to P2 is described. However, if the discharge pressure P is decreased from the P2 to 91 as illustrated in FIG. 19, it is preferable to correct the discharge pressure P using the time constant Tpb. Next, the correction of the pump control current I as one of the control signals for driving the hydraulic pump 21 is described in detail. FIG. 25 illustrates a graph for illustrating a change characteristic of the pump control current I in increasing a current I1 to a current I2. Referring to FIG. 25, an actual pressure change is illustrated with a solid line and a pressure change in a case of correcting the pump control current in consideration of the discharge flow rate changing characteristic inherent in the hydraulic pump 21 is indicated by a one-dot chain line. The current change corrected in consideration of the discharge flow rate changing characteristic inherent in the hydraulic pump 21 changes without following the actual current change and with a time lag.

Figure 26:
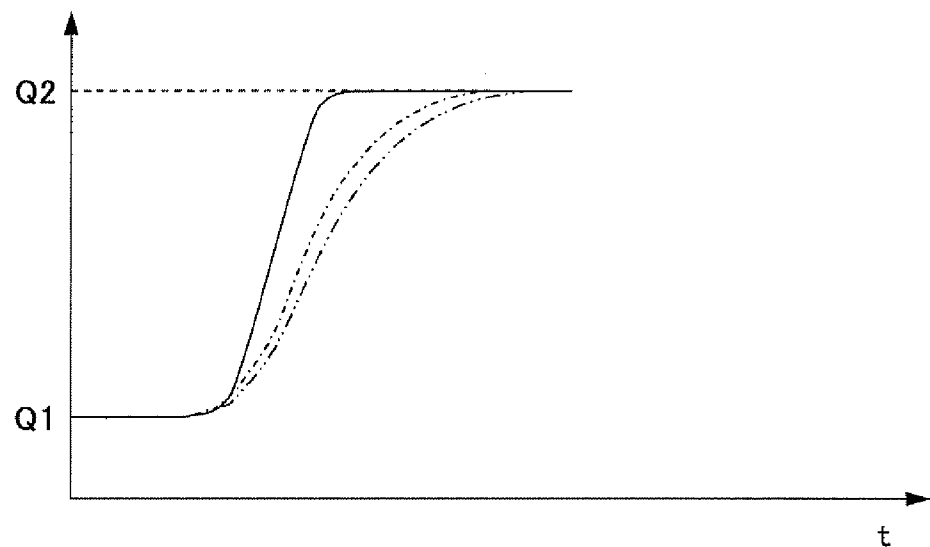
FIG. 26 is a graph illustrating a change of the pump discharge flow rate corresponding to a current change illustrated in FIG. 25.

FIG. 26 illustrates a change of the pump discharge flow rate Q calculated based on the pressure change illustrated in FIG. 25. If the pump control current I is increased from I1 to I2, the discharge flow rate is increased from Q1 to Q2. Referring to FIG. 26, the solid line indicates a change of the discharge flow rate calculated without correction based on the actual current change indicated by the solid line of FIG. 25. Referring to FIG. 26, the change of the discharge flow rate in consideration of the current change characteristic indicated by the one-dot chain line of FIG. 25 is indicated also by the one-dot chain line of FIG. 26. However, if there is the actual current change indicated by the solid line of FIG. 25, the actual discharge flow rate cannot follow the pressure change, and the actual discharge flow rate changes in accordance with the discharge flow rate changing characteristic inherent in the hydraulic pump 21 as indicated by the two-dot chain line of FIG. 26.

If the current change is corrected in consideration of the discharge flow rate as indicated by the one-dot chain line of FIG. 25 in consideration of the discharge flow rate changing characteristic and the discharge flow rate is calculated based on the corrected pressure change, it is possible to calculate the discharge flow rate change as indicated by the one-dot chain line of FIG. 26 approximate to the actual discharge flow rate indicated by the two-dot chain line of FIG. 26.

As described, by calculating the discharge flow rate of the hydraulic pump 21 with the pump control current I corrected in consideration of the inherent discharge flow rate changing characteristic, it is possible to calculate the discharge flow rate substantially equal to the actual discharge flow rate. Thus, the output of the hydraulic pump 21 can be more accurately calculated. With this, it is possible to accurately acquire an input to the hydraulic pump 21 and the assist amount for the motor generator 34 can be appropriately set. As a result, the load on the engine 30 can be appropriately controlled to thereby prevent degradation of fuel consumption and engine stall of the engine 30 from occurring.

The changing characteristic of the pump control current I is preferably adjusted by an operation mode of the working machine. For example, referring to FIG. 2, there are a heavy excavation mode (H mode), a standard excavation mode (S mode) and a finishing excavation mode (L mode) in a hydraulic shovel as an example of the hybrid working machine. It is preferable to change the characteristic of the hydraulic pump relative to the modes so that the hydraulic pump is suitable for excavation conditions. Therefore, the change characteristic of the pump control current I is differently set up. By adjusting the time constant of the change of the pump control current I depending on the operation modes, the characteristic of the hydraulic pump is changed to fit the hydraulic pump for the excavation conditions.

Figure 30:
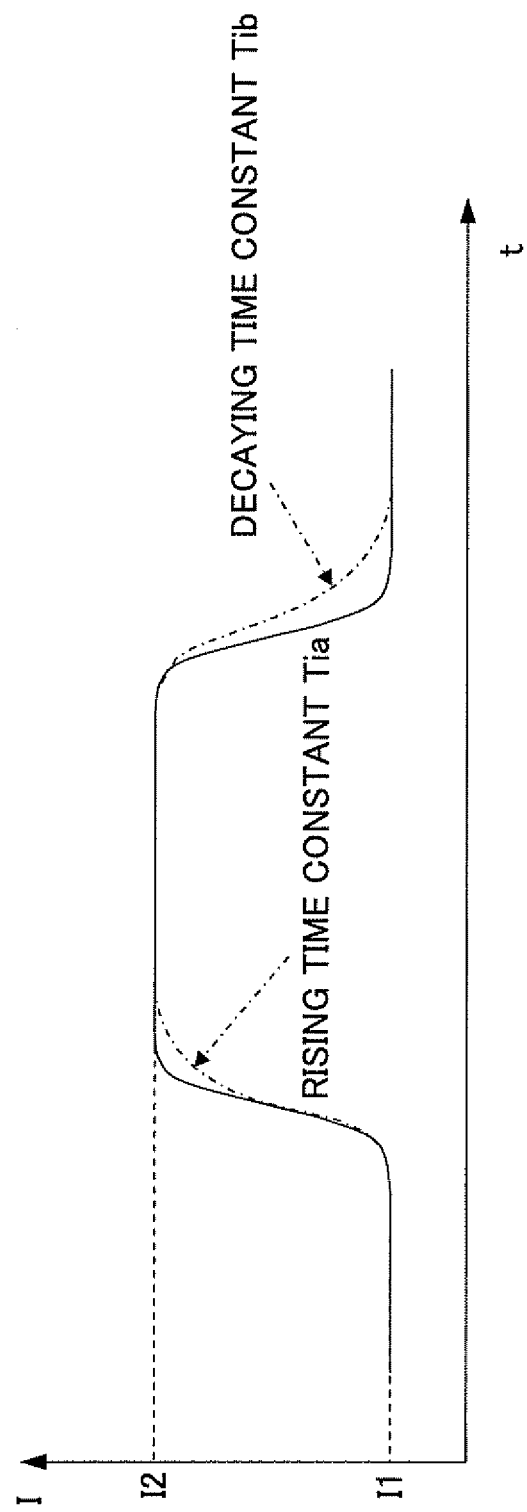
FIG. 30 is a graph illustrating a change characteristic of the pump control current.

In the above description, the pump control current I is corrected using the rise-up time constant Tia when the pump control current I is changed from I1 to I2. As illustrated in FIG. 30, it is preferable to correct the pump control current I by using the fall-down time constant Tib in decreasing the pump control current from I2 to I1 as illustrated in FIG. 30.

Next, the correction of the negative control pressure Pn as one of the control signals for controlling driving of the hydraulic pump 21 is described in detail later. FIG. 27 is a graph illustrating a change characteristic in increasing the nega-con pressure PnI from a pressure Pn1 to Pn2. Referring to FIG. 27, the actual nega-con pressure change is indicated by the solid line, and the pressure change corrected by the nega-con pressure in consideration of the pressure change characteristic is indicated by the one-dot chain line. The nega-con change in which the discharge pressure is corrected in consideration of the discharge flow rate changing characteristic inherent in the hydraulic pump is indicated by the one-dot chain line. The nega-con pressure change in which the discharge pressure is corrected in consideration of the discharge flow rate characteristic inherent in the hydraulic pump 21 does not follow the nega-con pressure change and changes with a time lag.

FIG. 28 illustrates a change of the pump discharge flow rate Q corresponding to the nega-con pressure change illustrated in FIG. 27. If the nega-con pressure Pn is increased from the Pn1 to Pn2, the pump discharge flow rate Q is decreased from Q1 to Q2. Referring to FIG. 28, the solid line indicates a change of the discharge flow rate calculated without correction based on the actual pressure change indicated by the solid line of FIG. 27. However, if there is the actual pressure change indicated by the solid line of FIG. 27, the actual discharge flow rate cannot follow the pressure change, and the actual discharge flow rate changes in accordance with the discharge flow rate changing characteristic inherent in the hydraulic pump 21 as indicated by the two-dot chain line of FIG. 28.

If the nega-con pressure change is corrected in consideration of the discharge flow rate changing characteristic as indicated by the one-dot chain line of FIG. 27 in consideration of the discharge flow rate changing characteristic and the discharge flow rate is calculated based on the corrected nega-con pressure change, it is possible to calculate the discharge flow rate change as indicated by the one-dot chain line of FIG. 28 approximate to the actual discharge flow rate indicated by the two-dot chain line of FIG. 28.

As described, by calculating the discharge flow rate of the hydraulic pump 21 with the corrected nega-con pressure Pn corrected in consideration of the inherent discharge flow rate changing characteristic, it is possible to calculate the discharge flow rate substantially equal to the actual discharge flow rate. Thus, the output of the hydraulic pump 21 can be more accurately calculated. With this, it is possible to accurately acquire an input to the hydraulic pump 21 and the assist amount for the motor generator 34 can be appropriately set. As a result, the load on the engine 30 can be appropriately controlled to thereby prevent degradation of fuel consumption and engine stall of the engine 30 from occurring.

Figure 31:
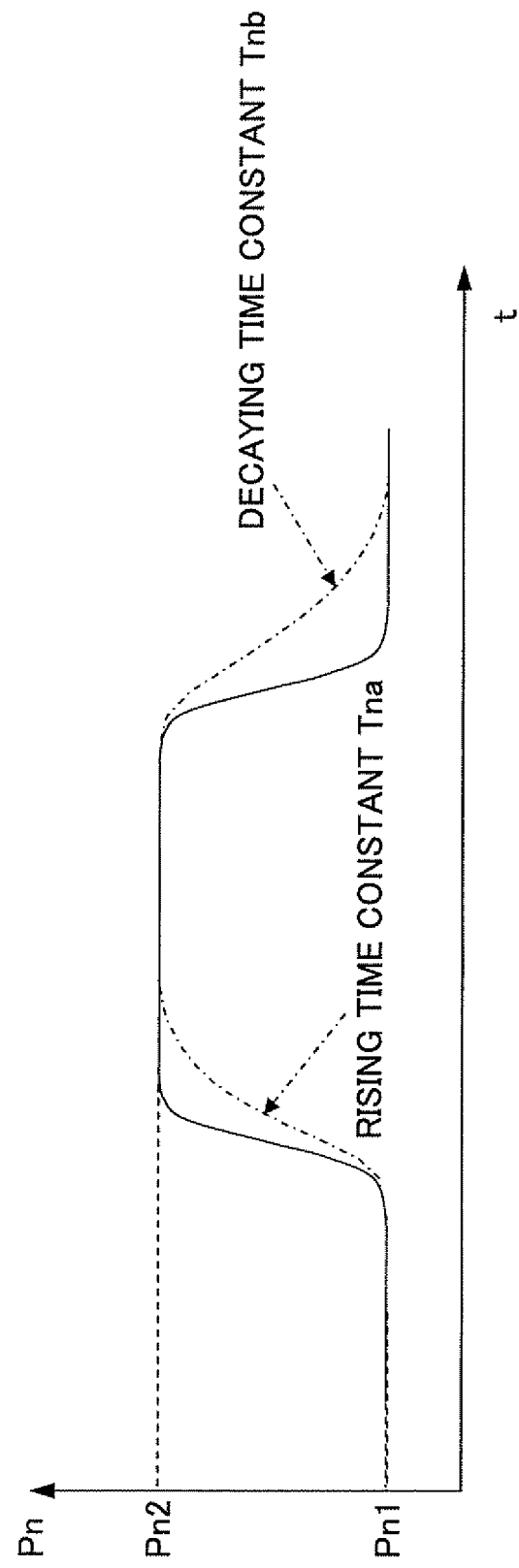
FIG. 31 is a graph illustrating a change characteristic of the negative control pressure.

In the above description, the nega-con pressure Pn is corrected using the rise-up time constant Tna when the nega-con pressure Pn is increased from Pn1 to Pn2. Referring to FIG. 31, it is preferable to correct the nega-con pressure Pn using the fall-down time constant in decreasing the nega-con pressure Pn from Pn2 to Pn1.

As described, the discharge flow rate changing characteristic inherent in the hydraulic pump 21 is acquired, the output Whyd of the hydraulic pump 21 is calculated as an assumed hydraulic pressure output after correction based on the inherent discharge flow rate changing characteristic, and the output of the motor generator 34 is controlled based on the calculated output Whyd of the hydraulic pump 21. Specifically, the output of the motor generator 34 is controlled so as to be the same as a difference between the output Whyd of the hydraulic pump 21 and the output We of the engine 30 like Wa=Whyd−We. Further, if the output Whyd of the hydraulic pump 21 becomes greater than the sum of the output We of the engine 30 and the output Wa of the motor generator 34 in a case where a positive value is generated in the electromotive driving state like Whyd>We+Wa, an excessive load is applied to the engine 30. Therefore, the difference between the output Whyd of the hydraulic pump 21 and the maximum output Wamax of the motor generator 34 is controlled to be less than the maximum output Wemax of the engine like Wemax>Whyd−Wamax.

If there is a request of outputting to an electrical load by an output Wout, the maximum output Wamax of the assist motor 34 in the electromotive state is limited to be in a range less than the difference between the maximum output Wbmax of the battery 38 and the requested output Wout to the electrical load like Wamax<Wbmax−Wout.

Further, like Embodiments 1 and 2, the motor generator 34 may be controlled by distributing power as illustrated in FIG. 19.

Embodiment 3 may be combined to Embodiment 1, Embodiment 2, or any one of the modified examples of Embodiment 1 and Embodiment 2, assumed hydraulic pressure output (hydraulic pump output on the shaft input side) Win can be accurately calculated. With this, the output of the engine 30 or the load on the engine 30 can be accurately controlled. Therefore, the engine is constantly controlled to be loaded by an appropriate amount of the load. Thus, the engine 30 is driven with high efficiency.

With Embodiment 3, the hybrid working machine using the nega-con circuit is described. However, it is unnecessary to correct as illustrated in FIG. 27 or FIG. 28 in a case there the positive control or the load sensing control is carried out.

Further, the correction method of Embodiment 3 may be carried out within the hydraulic load estimating operation part 70 illustrated in FIG. 19.

Furthermore, the correction method illustrated in Embodiment 3 may be used by combining Embodiments 1 and 2.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

This patent application is based on Japanese Priority Patent Application No. 2009-007949 filed on Jan. 16, 2009 and Japanese Priority Patent Application No. 2009-142638 filed on Jun. 15, 2009, the entire contents of which are hereby incorporated herein by reference.

INDUSTRIAL APPLICABILITY

The present invention is applicable to a hybrid working machine in which an electric motor assists an internal combustion engine to drive a pump for generating an oil pressure.

EXPLANATION OF REFERENCE SIGNS

1: engine motor
2: controller
3: mode selector
4: throttle volume
5: electromagnetic proportional valve
21: hydraulic pump
21A: pilot gear pump
22: controller valve
22a, 22b, 22c: directional control valve
23: pump discharge pressure sensor
24: negative control metering valve (nega-con metering valve)
25: tank
26: negative control sensor (nega-con sensor)
27: regulator
30: engine
32: splitter
34: assist motor
36, 40: inverter
38: battery
42: controller
50: efficiency-map control-amount automatic calculation part
52, 58: actual hydraulic pressure output calculating part 54: hydraulic pump efficiency map
56: P-Q map control-amount automatic calculation part
60: P-Q map
70: hydraulic load estimating operation part
72: engine output range determining part
74: battery output determining part
74A: battery output range determining part
74B: battery output target value determining part
74C: charge state calculating part
80: power distributing part

The invention claimed is:

1. A hybrid working machine comprising:
an engine;
a variable displacement hydraulic pump connected to the engine;
a motor generator connected to the engine; and
a control unit controlling the motor generator;
wherein the control unit calculates an actual hydraulic pressure output value of the variable displacement hydraulic pump from an output of the engine and an output of the motor generator, acquires a calculation value of the hydraulic pump based on a pump current supplied to the hydraulic pump and a discharge pressure of the hydraulic pump using an assumed hydraulic pressure output calculating part, corrects a hydraulic pump characteristic parameter used in the assumed hydraulic pressure output calculating part based on an assumed pressure error between the calculation value and the actual hydraulic pressure output value of the hydraulic pump, calculates an assumed hydraulic pressure correction output using the corrected hydraulic pump characteristic parameter, and controls the motor generator based on the assumed hydraulic pressure correction output.

2. The hybrid working machine according to claim 1, wherein the calculation value of the hydraulic pump is an assumed hydraulic pressure output as an output from the hydraulic pump, the actual hydraulic pressure output value of the hydraulic pump is an actual hydraulic pressure output as an actual output of the hydraulic pump, the control unit calculates the actual hydraulic pressure output value from the output of the engine and the output of the motor generator, calculates the assumed hydraulic pressure output from the pump current supplied to the hydraulic pump and the discharge pressure of the hydraulic pump using the assumed hydraulic pressure output calculating part, and calculates the assumed hydraulic pressure error as a difference between the assumed hydraulic pressure output and the actual hydraulic pressure output.

3. The hybrid working machine according to claim 1, wherein the hydraulic pump characteristic parameter is a hydraulic pump efficiency map.

4. The hybrid working machine according to claim 1, wherein the hydraulic pump characteristic parameter is a pressure flow rate characteristic diagram of the hydraulic pump.

5. The hybrid working machine according to claim 1, wherein the control unit calculates the actual hydraulic pressure output in consideration of a power loss in the hydraulic pump and a power loss in the motor generator.

6. The hybrid working machine according to claim 1, wherein the hydraulic pump characteristic parameter is a control signal of the hydraulic pump, the control signal is corrected to bring a characteristic of the hydraulic pump closer to a discharge flow rate changing characteristic of the hydraulic pump, the output of the hydraulic pump is calculated based on the corrected control signal, and the output of the motor generator assisting the engine is controlled based on the calculated output of the hydraulic pump.

7. The hybrid working machine according to claim 6, wherein the control signal is corrected to have a time lag.

8. The hybrid working machine according to claim 6, wherein control signal indicates the discharge pressure or the control current of the hydraulic pump.

9. The hybrid working machine according to claim 8, wherein when the output of the hydraulic pump is calculated the discharge flow rate changing characteristic inherent in the hydraulic pump corresponding to a change of a signal indicative of the negative control pressure as the control signal is acquired,
the discharge quantity of the hydraulic pump is calculated based on the acquired discharge flow rate changing characteristic, and
the output of the hydraulic pump is calculated by using a smaller one of the discharge quantity calculated based on the acquired discharge flow rate changing characteristic and the discharge quantity calculated from the negative control pressure as the discharge quantity of the hydraulic pump.

10. The hybrid working machine according to claim 6, wherein the discharge flow rate changing characteristic inherent in the hydraulic pump caused by a change of the control signal of the hydraulic pump is acquired for respective operation modes of the hybrid working machine.

11. The hybrid working machine according to claim 6, wherein the discharge flow rate changing characteristic inherent in the hydraulic pump is acquired respectively for an increment and a decrement of the control signal.

12. A control method for a hybrid working machine in which a hydraulic pump having a discharge flow rate changing characteristic inherent in a control signal is driven by an output of an engine, the control method comprising:
correcting the control signal to bring a characteristic of the hydraulic pump closer to the discharge flow rate changing characteristic inherent in the control signal;
calculating the output of the hydraulic pump based on the output of the corrected control signal; and
controlling an output of a motor generator assisting the engine based on the calculated output of the hydraulic pump.

13. The control method according to claim 12, wherein the correcting corrects the control signal to have a time lag.

14. The control method according to claim 12, wherein the control signal indicates the discharge pressure or the control current of the hydraulic pump.

15. The control method according to claim 12, wherein the calculating the output of the hydraulic pump includes:
acquiring the discharge flow rate changing characteristic inherent in the hydraulic pump corresponding to a change of a signal indicative of the negative control pressure as the control signal,
calculating the discharge quantity of the hydraulic pump based on the acquired discharge flow rate changing characteristic, and
calculating the output of the hydraulic pump by using smaller one of the discharge quantity calculated based on the acquired discharge flow rate changing characteristic and the discharge quantity calculated from the negative control pressure as the discharge quantity of the hydraulic pump.

16. The control method according to claim 12, wherein the discharge flow rate changing characteristic inherent in the hydraulic pump caused by a change of the control signal of the hydraulic pump is acquired for respective operation modes of the hybrid working machine.

17. The control method according to claim 12, wherein the discharge flow rate changing characteristic inherent in the hydraulic pump is acquired respectively for an increment and a decrement of the control signal.

* * * * *